United States Patent
Allano et al.

(10) Patent No.: US 9,710,914 B2
(45) Date of Patent: Jul. 18, 2017

(54) METHOD, SYSTEM AND COMPUTER PROGRAM PRODUCT FOR IMPROVING THE QUALITY OF AN IMAGE

(71) Applicants: Biomerieux, Marcy-l'Etoile (FR); Commissariat a l'Energie Atomique et aux Energies Alternatives, Paris (FR)

(72) Inventors: Lorene Allano, Sevres (FR); Khrystyna Kyrgyzova, Sceaux (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 14/892,848

(22) PCT Filed: May 22, 2014

(86) PCT No.: PCT/EP2014/060579
§ 371 (c)(1),
(2) Date: Nov. 20, 2015

(87) PCT Pub. No.: WO2014/187917
PCT Pub. Date: Nov. 27, 2014

(65) Prior Publication Data
US 2016/0093033 A1    Mar. 31, 2016

(30) Foreign Application Priority Data

May 23, 2013 (EP) ..................... 13305672
May 23, 2013 (EP) ..................... 13305673
Aug. 12, 2013 (EP) ..................... 13180149

(51) Int. Cl.
*G06K 9/40* (2006.01)
*G06T 7/00* (2017.01)
(Continued)

(52) U.S. Cl.
CPC .......... *G06T 7/0073* (2013.01); *G06T 3/4007* (2013.01); *G06T 5/50* (2013.01);
(Continued)

(58) Field of Classification Search
CPC ....... G06T 5/50; G06T 7/0073; G06T 7/0055; G06T 7/408; G06T 3/4007;
(Continued)

(56) References Cited

U.S. PATENT DOCUMENTS 5,852,675 A * 12/1998 Matsuo ................ H04N 1/6033
                                                          382/167
6,088,612 A    7/2000 Blair
(Continued)

FOREIGN PATENT DOCUMENTS

WO         9938121 A1    7/1999

OTHER PUBLICATIONS

International Preliminary Report on Patentability mailed Dec. 3, 2015 for International Application No. PCT/EP2014/060579.
(Continued)

*Primary Examiner* — Kanjibhai Patel
(74) *Attorney, Agent, or Firm* — Brinks Gilson & Lione

(57) ABSTRACT

A method for correcting one or more images of an object (107) from a plurality of images of the object (107), for providing one or more corrected images of the object (107) for further use in a process for generating a representation of the surface of the object, each image of the plurality of images comprising one or more pixels and each pixel comprising a pixel value, wherein one or more illumination sources (104, 105, 106) illuminate the object with different directions of illumination, and each image is associated with a determined direction of illumination, the method comprising the steps of: for each pixel of the plurality of a first image of said plurality of images: a) selecting a pixel in the first
(Continued)

Illumination directions of imaging system image for obtaining the pixel value of the selected pixel; b) selecting at least one corresponding pixel in at least one image of the remaining images of the plurality of images for obtaining the pixel value of the at least one selected corresponding pixel; c) calculating at least one ratio of the pixel value of the selected pixel in the first image to each pixel value of the at least one selected corresponding pixel; d) determining a requirement for pixel value correction of the selected pixel on the basis of the at least one calculated ratio; e) calculating a value (W) based on the at least one calculated ratio to determine a corrected pixel value of the selected pixel; f) replacing the pixel value of the selected pixel with the corrected pixel value in the first image to provide a corrected first image.

15 Claims, 36 Drawing Sheets

(51) Int. Cl.
G06T 3/40 (2006.01)
G06T 5/50 (2006.01)
G06T 15/50 (2011.01)
H04N 9/31 (2006.01)
G06T 7/514 (2017.01)
G06T 7/586 (2017.01)
G06T 7/90 (2017.01)

(52) U.S. Cl.
CPC .............. *G06T 7/514* (2017.01); *G06T 7/586* (2017.01); *G06T 7/90* (2017.01); *G06T 15/506* (2013.01); *H04N 9/315* (2013.01); *G06T 2207/10024* (2013.01); *G06T 2207/10152* (2013.01); *G06T 2207/20221* (2013.01)

(58) Field of Classification Search
CPC . G06T 2207/10152; G06T 2207/20221; G06T 2207/10024; G06T 7/514; G06T 7/586; G06T 7/90; G06T 15/506; H04N 9/315
USPC .......................................... 382/165, 167, 274
See application file for complete search history.

(56) References Cited

U.S. PATENT DOCUMENTS

| | | | |
|---|---|---|---|
| 6,341,016 B1* | 1/2002 | Malione | G01B 11/2509 345/419 |
| 2003/0012449 A1* | 1/2003 | Usikov | G06T 5/008 382/274 |
| 2005/0162638 A1* | 7/2005 | Suzuki | G01C 3/08 356/4.04 |
| 2006/0181749 A1* | 8/2006 | Browne | G01N 21/59 358/509 |

OTHER PUBLICATIONS

Argyriou et al., "Photometric Stereo with an Arbitrary Number of Illuminants," Computer Vision and Image Understanding, 2010, vol. 114, No. 8, pp. 887-900.
Feris et al., "Specular Reflection Reduction with Multi-Flash Imaging," Proceedings of the XVII Brazilian Symposium on Computer Graphics and Image Processing, 2004, pp. 316-321.

* cited by examiner

FIG. 1: Illumination directions of imaging system

FIG. 2: Modules of imaging system

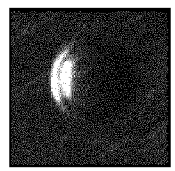 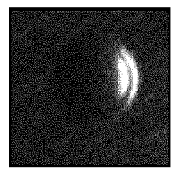 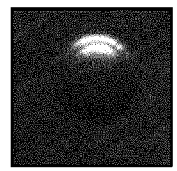 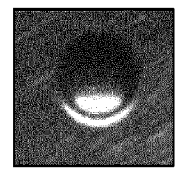
FIG. 52a  FIG. 52b  FIG. 52c  FIG. 52d
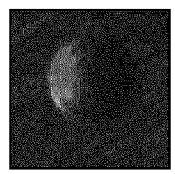 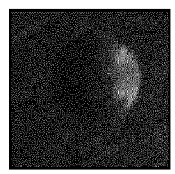 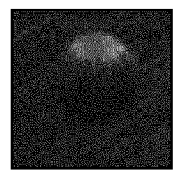 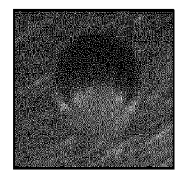
FIG. 53a  FIG. 53b  FIG. 53c  FIG. 53d
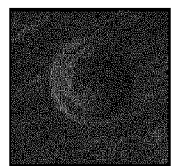 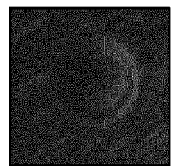 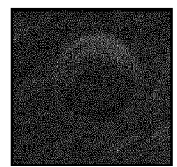 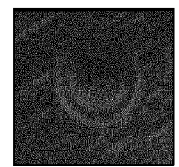
FIG. 54a  FIG. 54b  FIG. 54c  FIG. 54d
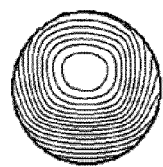 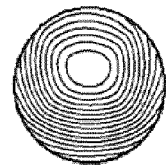 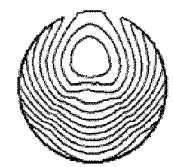 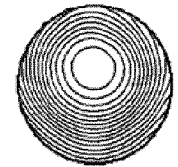
FIG. 55  FIG. 56  FIG. 57  FIG. 58

FIG. 87

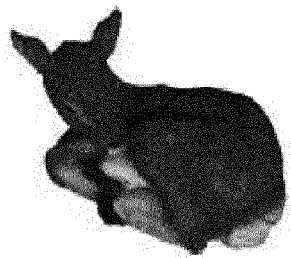 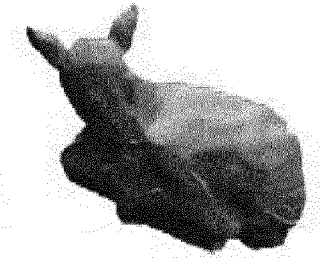 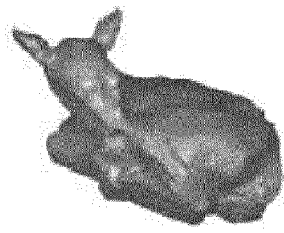
*FIG. 88a*  *FIG. 88b*  *FIG. 88c*
*FIG. 88d*

| GT surface | Criterion #1 | Criterion #2 | Criterion #3 |
|---|---|---|---|
| 300x467x(3x10) | $it_{max}=10$<br>t=15.5753s | Err < 0.125<br>t=25.5242s | Var < $2.5 * 10^{-4}$<br>t=17.0301s |
| 334x467x(3x10) | $it_{max}=10$<br>t=17.6430s | Err < 0.031<br>t=4.6547s | Var < $1.1 * 10^{-3}$<br>t=31.5791s |
| 467x600(3x10) | $it_{max}=10$<br>t=37.1757s | Err < 0.075<br>t=47.7892s | Var < $1.5 * 10^{-3}$<br>t=79.3082s |

*FIG. 89*

METHOD, SYSTEM AND COMPUTER PROGRAM PRODUCT FOR IMPROVING THE QUALITY OF AN IMAGE

This application is a National Stage application of International Application No. PCT/EP2014/060579 filed May 22, 2014. This application also claims priority under 35U.S.C. §119 to EP Patent Application No. 13180149.0, filed Aug. 12, 2013; EP Patent Application No. 13305673.9, filed May 23, 2013; and EP Patent Application No. 13305672.1, filed May 23, 2013.

FIELD OF THE INVENTION

The present invention relates to a method, system and computer program product for improving the quality of an image, and more specifically for correcting an image by removing bright zones and dark zones within the image.

BACKGROUND OF THE INVENTION

In the domain of image processing, the improvement of the quality of images is a well-known problem to be solved. Such improvement is required for many technical applications, such as biological applications. In the domain of biological analysis, in vitro analysis is carried out on a biological sample to identify the type of micro-organisms potentially present in the biological sample. Such analysis can be performed by associating the biological sample with a specific environment such as a specific growth medium. The specific environment can be located, for example, in a Petri dish. The specific environment is adapted to the biological sample to be analyzed to allow the growth of micro-organisms. The Petri dish comprising the biological sample and the specific environment is then put in an incubator to generate the growth of micro-organisms.

After the incubation process, an analysis of the surface of the specific environment is performed to determine the type of micro-organisms that have grown in the Petri dish. The analysis comprises several steps, including illumination of the surface of the Petri dish with an imaging system as described in the published European application EP2520923. The imaging system comprises several illumination sources located around the biological sample. Each illumination source illuminates the biological sample from a different direction. A fixed position camera takes various images of a same surface of the Petri dish. A photometric stereo process is then applied to combine the data captured from the various images to provide a deepness map or a raised relief map of the surface of the Petri dish comprising objects such as micro-organisms.

Due to the different illumination directions of the various illumination sources and the specific nature of the micro-organisms, bright zones, such as specular zones, may appear. Bright zones correspond to high intensity pixels associated with a highlighted or specular zone in an image. During image processing procedures such as segmentation, object recognition or surface reconstruction, such bright and dark zones may cause a distortion effect on the corresponding output maps. This distortion effect may lead to an incorrect representation of the surface object on the deepness map.

In a similar manner, when considering an object having a determined height, other than the content of a Petri dish, dark zones may appear. During image processing procedures, such dark zones may also cause a distortion effect on the corresponding deepness map and thus lead to an incorrect representation of the object on the deepness map.

In the prior art, several methods for removing specular zones are disclosed. One of the methods comprises steps for identifying the specular zones within several images of a same object and then providing a single corrected image of the object where the pixels related to the specular zones are replaced with corrected pixel values.

However, in the present example, the multiple images of the object taken under different illumination directions must not be reduced after removing bright or dark zones. Indeed, each image of the object provides relevant information regarding the distribution of light on the object for further determination of the surface of the object during the photometric stereo process in order to identify the nature of the micro-organisms.

As a result, there is a need to improve the quality of the images of an object, each image being taken under different illumination conditions with a fixed position camera to prevent the occurrence of image distortion caused by bright and dark zones in such images, the aim being to retain the multiplicity of the images after improving the quality of the images and also to retain the distribution of intensity of illumination sources for each image.

Objects Of The Invention

It is an object of the present invention to overcome at least some of the problems associated with the prior art.

It is a further object of the invention to provide a method, system and computer program product to improve the quality of images to be used at least in a process for providing a raised relief map of an object, such as a photometric stereo process.

SUMMARY OF THE INVENTION

The present invention provides a method, system and computer program product for providing corrected images of an object as set out in the accompanying claims. According to a first aspect of the present invention, there is provided a method for correcting one or more images of an object from a plurality of images of the object, for providing one or more corrected images of the object for further use in a process for generating a representation of the surface of the object, each image of the plurality of images comprising one or more pixels and each pixel comprising a pixel value, wherein one or more illumination sources illuminate the object with different directions of illumination, and each image is associated with a determined direction of illumination, the method comprising the steps of:

for each pixel of the plurality of a first image of said plurality of images:
a) selecting a pixel in the first image for obtaining the pixel value of the selected pixel;
b) selecting at least one corresponding pixel in at least one image of the remaining images of the plurality of images for obtaining the pixel value of the at least one selected corresponding pixel;
c) calculating at least one ratio of the pixel value of the selected pixel in the first image to each pixel value of the at least one selected corresponding pixel;
d) determining a requirement for pixel value correction of the selected pixel on the basis of the at least one calculated ratio;
e) calculating a value (W) based on the at least one calculated ratio to determine a corrected pixel value of the selected pixel;

f) replacing the pixel value of the selected pixel with the corrected pixel value in the first image to provide a corrected first image;

Preferably, the method further comprises the step of repeating steps a), b), c), d), e) and f) for at least one image of the remaining non-corrected images to provide at least one further corrected image.

Preferably, the step of determining a corrected pixel value further comprises applying a determined mathematical formula which comprises a sigmoid function.

Preferably, the mathematical formula comprises a parameter determining the required level of pixel value correction.

Preferably, the mathematical formula comprises a parameter determining the sharpness of transition of the sigmoid function.

Preferably, the mathematical formula comprises a parameter for adapting the level of pixel value correction.

Preferably, the plurality of images comprises different types of zones such as bright zones and/or dark zones.

Preferably, the selected pixel is associated with a bright zone of an image.

Preferably, the selected pixel is associated with a dark zone of an image.

Preferably, the step of determining a corrected pixel value depends on the type of zone associated with the selected pixel.

Preferably, each of the one or more initial images comprises the three color channels Red, Green, Blue and wherein steps a), b), c), d) and e) are iteratively carried out for each pixel, for each image and for each color channel.

According to a second aspect of the present invention, there is provided a computer program product comprising stored computer-executable instructions which, when executed by a computer system, implement the method of the present invention.

According to a third aspect of the present invention, there is provided an imaging system for correcting a plurality of images of an object to provide corrected images of the object for further use in a process for generating a representation of the object, each image of the plurality of images comprising one or more pixels and each pixel comprising a pixel value, the imaging system comprising:

one or more illumination sources to illuminate the object with different directions of illumination, wherein each image is associated with a determined direction of illumination;

an image capture device for obtaining pixel values of each pixel in each image of the plurality of images;

a data processor for calculating at least one ratio of the pixel value of a selected pixel in a first image of said plurality of images to pixel values of at least one corresponding pixel selected in the remaining images of the plurality of images and for calculating a mean value of the ratio of the selected pixel to determine the requirement for pixel value correction of the pixel value of the selected pixel and to determine a corrected pixel value of the pixel value of the selected corresponding pixel, wherein the data processor replaces the pixel value of the selected pixel with the corrected pixel value to provide a corrected image.

BRIEF DESCRIPTION OF THE DRAWINGS

Reference will now be made, by way of example, to the accompanying drawings, in which:

FIGS. 52a, 52b, 52c, and 52d represent four initial images of a circular object comprising bright zones at different locations without any overlapping zones, according to an embodiment of the present invention;

FIGS. 53a, 53b, 53c, and 53d represent images of the circular object of FIGS. 52a, 52b, 52c, and 52d where bright zones have been corrected using an inpainting process well-known in the prior art, according to an embodiment of the present invention;

FIGS. 54a, 54b, 54c, and 54d represent corrected images of the circular object of FIGS. 52a, 52b, 52c, and 52d after application of the method of the present invention relating to soft correction, according to an embodiment of the present invention;

FIG. 55 represents a schematic view of contour lines of the surface of the circular object of FIGS. 52a, 52b, 52c, and 52d after processing with a surface reconstruction method without any correction of bright zones, according to an embodiment of the present invention;

FIG. 56 represents a schematic view of contour lines of the surface of the circular object of FIGS. 52a, 52b, 52c, and 52d after processing with a surface reconstruction method with an inpainting process well-known in the prior art, according to an embodiment of the present invention;

FIG. 57 represents a schematic view of contour lines of the surface of the circular object of FIGS. 52a, 52b, 52c, and 52d using the prior art algorithm of Coleman and Jain, according to an embodiment of the present invention;

FIG. 58 represents a schematic view of contour lines of an object after processing with a surface reconstruction method according to an embodiment of the present invention, with specific settings of V_high, V_low, k_high, k_low and α_high, α_low, according to an embodiment of the present invention;

FIG. 87 shows a table for comparing different reconstructed surfaces obtained with the method of the present reconstruction process in the first and second embodiments of the present reconstruction process;

FIGS. 88a, 88b and 88c relate to an initial image, a ground truth normal image and a depth map image respectively;

FIG. 88d shows a table for comparing different reconstructed surfaces obtained with the method of the present reconstruction process when considering different initialization operations;

FIG. 89 shows a table for comparing different reconstructed surfaces obtained with the method of the present reconstruction process when considering different termination conditions.

DETAILED DESCRIPTION OF THE INVENTION

Figure 1:
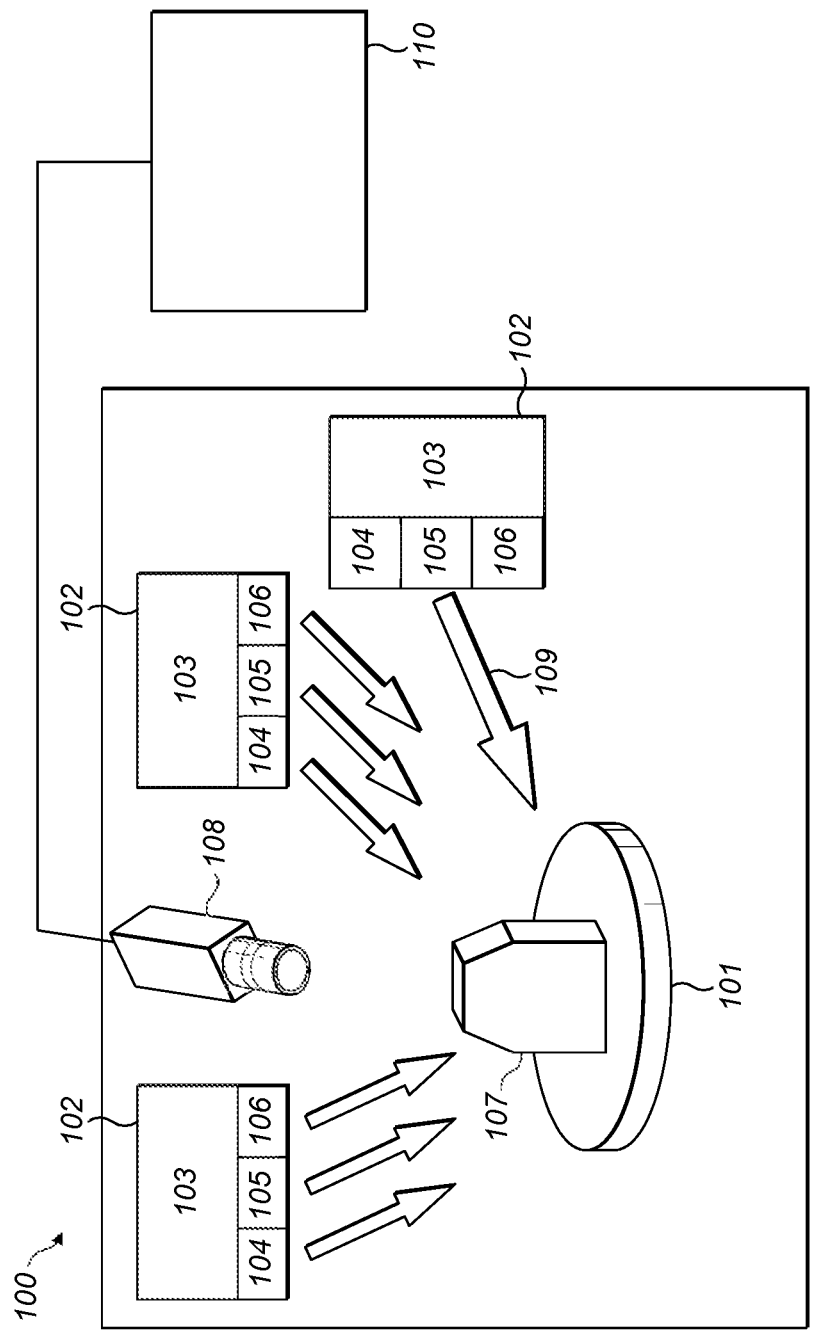
FIG. 1 shows a simplified diagram of an imaging system showing the various types of illumination directions used for an object, according to an embodiment of the present invention.

The description below discloses the invention in a sufficiently clear and complete manner, based on specific examples. However, the description should not be understood as limiting the scope of the protection to the specific embodiments and examples described below.

In the description below, the term "pixel" relates to a position in an image and the terms "pixel value" and "pixel intensity value" refer to the value or the corresponding captured intensity of a pixel in an image.

In the description below, the term "initial image" or "image" refers to various images of a same object wherein each image of the object corresponds to a specific illumination direction generated by one or more illumination sources. The one or more illumination sources may produce all RGB (Red, Green, and Blue) color channels. In addition, each image is taken with a fixed position camera at a determined location. The described embodiment comprises three images, i.e. images 1, 2 and 3 taken under different illumination directions with a camera having a fixed position. It should be understood that the present invention is also suitable for processing a plurality of N images. Each image comprises a plurality of M pixels and the three color channels in RGB space, i.e. Red, Green and Blue. Calculations below only consider one pixel such as pixel1 in each image as an example. It is understood that calculations may also apply to the plurality of M pixels of an image.

An image may be defined as the combination of two components. The first component is the diffuse component which corresponds to the part of light being reflected without any preferred direction. The second component is the specular component which corresponds to the part of light being reflected in a preferred direction. The aim of the present invention is to remove the specular component to retrieve the diffuse component.

The term "shading" relates to information which corresponds to the distribution of light on an object due to the position of light and the surface of the object. For present images, the information may be used to reconstruct the object surface with a further stereo photometric method.

The terms "incorrectly high", "incorrectly low" or "incorrect intensity" relate to pixel intensity value being higher than, lower than or incorrect in relation to the intensity value of other pixels in the image respectively.

In the description below, the term "bright zone" may relate to a specular zone of an image, i.e. a zone of an image comprising a specularity. A bright zone may comprise one or more bright pixels having an incorrect intensity. When considering a multiplicity of images and different bright zones in the images, a bright zone in an image should not completely overlap a bright zone in all other images.

In the description below, the term "dark zone" may relate to a shadow zone in an image of an object, wherein the dark zone may comprise one or more dark pixels. A dark pixel has an incorrect intensity. When considering a multiplicity of images and different dark zones in the images, a dark zone in an image should not completely overlap a dark zone in all other images.

In addition, in the description below, the word "object" may relate to any object being illuminated with various directions of illumination and wherein images of the object are taken with a fixed position camera. The object may relate to one or more objects of small dimension such as micro-organisms or to objects of a greater dimension such as a bottle of water.

FIG. 1 shows an imaging system 100 comprising one or more base units 102. Each base unit 102 includes the optics and control circuitry 103 for generating Red (R), Green (G), and Blue illumination. Each base unit 102 comprises corresponding Red, Green, Blue (B) illumination sources 104, 105, 106 which are all independently controllable. Illumination sources 104, 105, 106 may produce annular illumination, inverse annular illumination or lateral illumination, for example.

The imaging system 100 may optionally comprise a holding unit 101 for holding an object 107. Illumination sources 104, 105, 106 are located above the object.

Regarding the orientation of illumination sources 104, 105, 106, the optical axes of illumination sources 104, 105, 106 are arranged such that they apply illumination in a direction which may be non-perpendicular or perpendicular to the object 107. The imaging system 100 also includes an image capture device 108, such as a camera which is directed towards the holding unit 101. Illumination from any combination of illumination sources 104, 105, 106 from any of the base units 102 can be directed towards the object 107. The image capture device 108 may then capture images from any object 107 in the holding unit 106 which has been illuminated.

As shown in FIG. 1, an annular beam 109 may also illuminate the object 107 and is produced by one of the base units 102.

The illumination sources 104, 105, 106 may be of any preferred type, such as light emitting diodes (LED) operating at Red (R), Green (G) and Blue (B) frequencies; a simple white light source; an ultra-violet (UV) source or any other appropriate radiation source. The number of light sources in any location can vary from that shown and described herein. Each RGB illumination is made up of three LEDs operating at each respective frequency. For different illumination sources, there may be different combinations of RGB LEDs for example.

In addition to the control circuitry and optics 103 in each unit which controls the function thereof, there may be an overall control system 110 comprising at least a computer, a display unit, processing modules and image enhancing algorithms, image processing, and any other processes or techniques.

The control system 110 may be used to control which illumination sources are used for specific applications. In addition, the control system may apply different image enhancing techniques and image processing procedures for different applications. Image enhancing techniques are methods and techniques for enhancing the quality of an initial image or for making pertinent information, visible for an expert analyzing the content of the image, for example in the visible domain. Examples include: fusion of different images such as fusion of different images for improving detection of hemolysis, edge lighting correction, exposure time correction, etc. Image processing is the extraction of information from images in order to provide decision support or enable automatic decisions.

The control system may be used to carry out any other function and/or control operation for the imaging system. These include, but are not limited to:
controlling the level of luminance;
controlling the balance of the Red, Green, Blue components;
controlling exposure time;
controlling illumination combinations;
testing the system;
calibrating the system; and
any other appropriate control based on the use and purpose of the analysis.

The aim of the present invention is to improve the quality of images by correcting pixel values of pixels corresponding to bright pixels, and more specifically to highlight pixels or specular pixels, i.e. pixels having an incorrectly high intensity compared to other pixel values of the same pixel in other images, and correcting pixel values relating to dark pixels, such as shadow pixels, i.e. pixels having an incorrectly low intensity compared to the other pixel values of the same pixel in other images.

Figure 2:
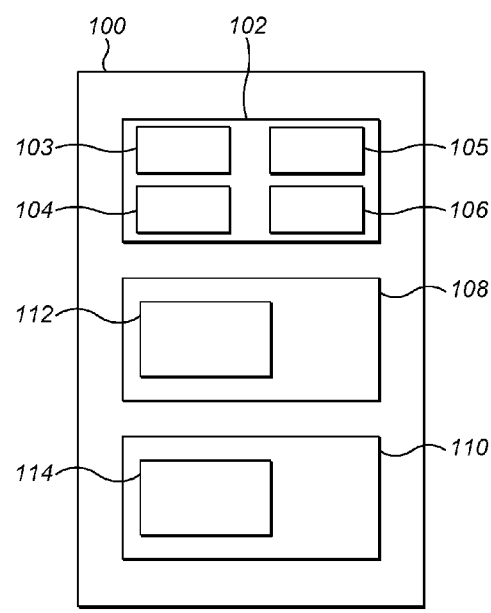
FIG. 2 shows a simplified diagram of the imaging system showing the modules of the imaging system, according to an embodiment of the present invention.

As shown in FIG. 2, the image capture device 108 comprises an intensity detection device 112 for selecting each pixel in an image and determining the corresponding pixel value or intensity I of the pixel. The intensity detection device 112 detects or captures the intensity of each pixel in a determined number of images and for each different color channel R, G, B.

In a first embodiment, the intensity detection device 112 selects an image such as image 1. The intensity detection device 112 then selects a specific color channel, such as color channel R. The intensity detection device 112 detects the pixel value of each pixel in image 1 for color channel R. When considering specific examples of pixel 1 in image 1, the detected pixel values may refer to IR1 (pixel1).

The intensity detection device 112 proceeds in the same manner with color channels G and B for image 1. In a similar manner, the detected pixel values may refer, for example, to IG1 (pixel1) for color channel G and IB1 (pixel 1) for color channel B.

The intensity detection device 112 then carries out the same steps for images 2 and 3. The intensity detection device 112 always selects corresponding pixels in all other images to determine the corresponding intensity of the same pixel in all the different images. It should be understood that the wording "same pixel" means that the pixel is located at the same location in all images. Thus, pixel 1 in image 1 is located at the same place as pixel 1 in images 2 and 3.

The detected pixel values refer to the following notations, for example when considering pixel1:
for image 2:
IR2(pixel1)
IG2(pixel1)
IB2(pixel1);

for image 3:

IR3(pixel1)

IG3(pixel1)

IB3(pixel1).

The intensity detection device 112 may store the detected intensities in a corresponding matrix such as matrix IR1 which represents all pixel values for image 1 and associated color channel R.

In a similar manner, the pixel values of all pixels of image 1 and associated with color channel G are organized in matrix IG1 and the pixel values of image 1 and related to color channel B are arranged in matrix IB1.

In the same manner that pixel values corresponding to pixels of image 1 are arranged in matrices IR1, IG1 and IB1, the detected pixel values of all pixels for all images are arranged in corresponding matrices which refer, for example, to:

IR2, for color channel R and image 2

IR3, for color channel R and image 3

IG2, for color channel G and image 2

IG3, for color channel G and image 3

IB2, for color channel B and image 2

IB3, for color channel B and image 3.

Due to the amount of pixel values gathered in the corresponding matrix, the intensity detection device 112 may process an unwrapping step to convert the matrix into a vector comprising a line of data and thus facilitate further calculations based on the pixel values.

Figure 3:
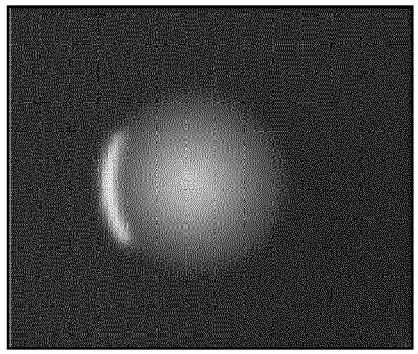
FIGS. 3, 4, 5 and 6 show several images of a same object, each image comprising bright zones at different locations, according to an embodiment of the present invention.
Figure 4:
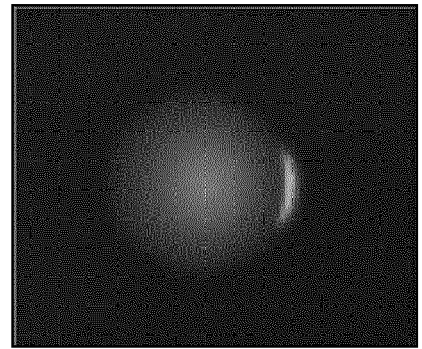
Figure 5:
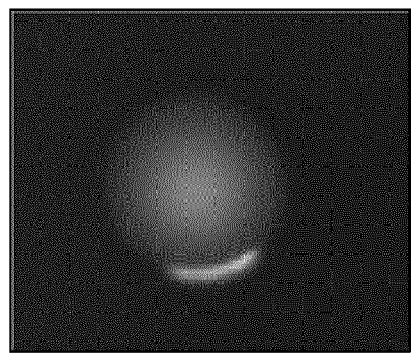
Figure 6:
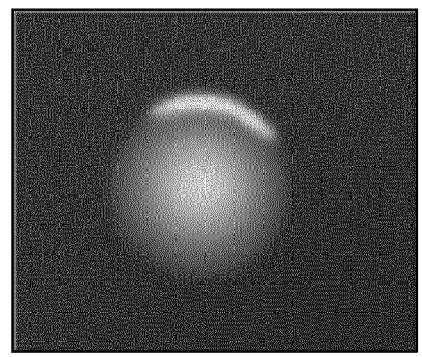
Figure 7:
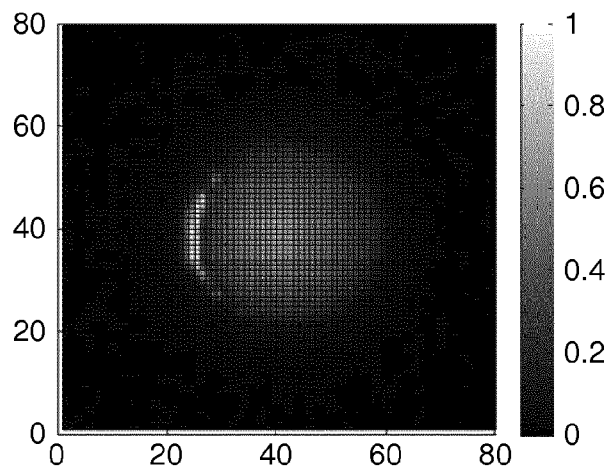
FIGS. 7, 8 and 9 respectively show a representation of FIG. 3 in Red/Green/Blue space, according to an embodiment of the present invention.
Figure 8:
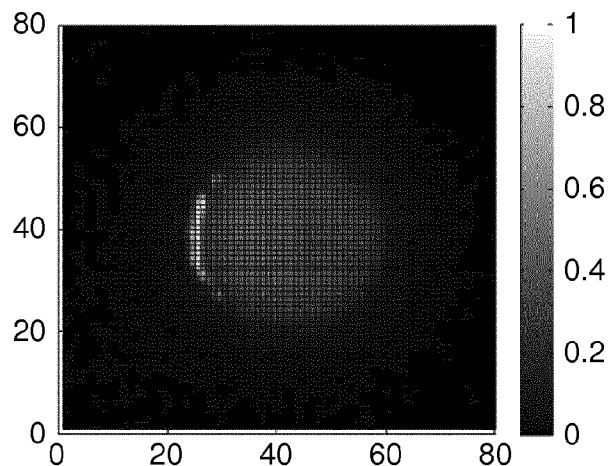
Figure 9:
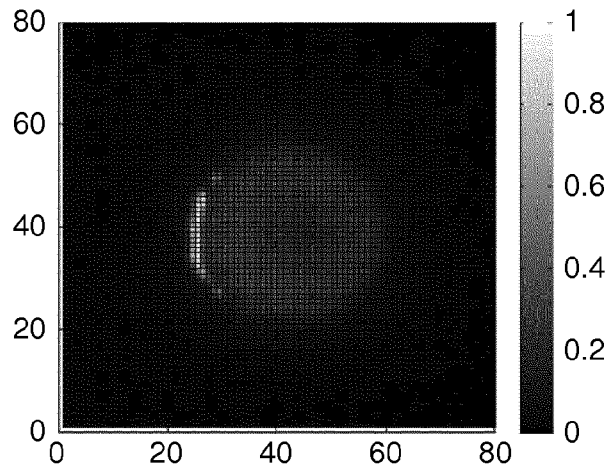

As shown in FIGS. 3, 4, 5 and 6, a bright zone may occur on a same object at different locations. FIG. 3 shows a bright zone on the left side of the object. FIG. 4 shows a bright zone on the right side of the object. FIG. 5 shows a bright zone at the bottom of the object and FIG. 6 shows a bright zone on the top of the object. A bright zone may also be considered in the RGB space. FIGS. 7, 8 and 9 refer to the Red channel, Green channel and Blue channel respectively for the representation of the bright zone shown in FIG. 3.

As shown in FIG. 2, the control system 110 also comprises a data processor 114 to carry out specific calculations based on pixel values and on a determined mathematical formula.

The data processor 114 may calculate specific ratios relating to the comparison between pixel values of pixels in a specific image for different color channels and pixel values of corresponding pixels in other images for corresponding color channels based on the above matrices. A ratio of 1 corresponds to the comparison of pixel values of two pixels having the same pixel value. Thus, when the ratio differs from 1, the ratio determines a discrepancy between a first pixel value of a pixel in an image and a second pixel value of the same pixel in one or more other images. Indeed, if the ratio is higher than 1, this means that the pixel in question corresponds to a brighter pixel. For example, the ratio may be 1.20, representing an increase of 20% of the ratio equal to 1. If the ratio is lower than 1, this means that the pixel in question corresponds to a darker pixel.

For image 1:

A ratio comprises, for example, IR1/IR2 to determine the presence of a bright zone in image 1 associated with color channel R when compared with image 2 for the same color channel.

The resulting ratio values may, for example, be arranged in corresponding matrices of ratios as follows, wherein each vector relates to the ratios of all pixels of image 1, pixel by pixel, and wherein each column of the matrices corresponds to a specific pixel in the related image.

For image 1:

IR1_ratio=(IR1/IR2; IR1/IR3)

IR2_ratio=(IR2/IR1; IR2/IR3)

IR3_ratio=(IR3/IR1; IR3/IR2)

For image 2 and image 3:

The data processor 114 iteratively carries out similar ratio calculations to obtain similar ratio matrices for images 2 and 3, and respectively for other color channels G and B for each image 1, 2, and 3 and for each pixel in image 2 and image 3.

When considering a multiplicity of N images, the data processor 114 iteratively carries out such ratio calculations for all pixels of all N images for each color channel.

The data processor 114 may also calculate a weighting value W which is a mean value based on the above obtained ratio matrices.

The mean value corresponds to a generalized mean value based on a statistical measure. The generalized mean aggregates values of a set of data to provide a resulting data value which characterizes or represents the set of data. The resulting data value is of the same type as any data value of the set of data. Thus, the resulting data value is comparable to any data value of the set of data. A generalized mean may refer to central tendency measures such as an arithmetic mean (namely an average), a weighted arithmetic mean, a geometric mean, or a median value of the calculated ratios.

In a first embodiment, the weighting value W is calculated for each pixel of each image and for each color channel and may be defined as indicated below:

$$W = \sum_{j=1}^{p} c_j \frac{I}{I_{ref\,j}}$$

In the above formula, $c_j$ is a coefficient allowing to compute weighted means. It may be equal to 1/p in the case of the arithmetic mean, wherein p is the number of reference images;

$I_{ref\,j}$ is the $j^{th}$ image in the plurality of p reference images;

I is the image to be corrected.

The resulting weighting values W may be arranged in corresponding weighting matrices as follows:

For color channel R:

WR1=mean IR1_ratio for all the pixels in the image 1

WR2=mean IR2_ratio for all the pixels in the image 2

WR3=mean IR3_ratio for all the pixels in the image 3

In the above example, WR1 is a weighting matrix gathering values of W for all pixels of the red channel of image 1.

Similar weighting matrices are obtained for the color channels G and B.

When considering a multiplicity of N images, the data processor 114 iteratively carries out such weight matrix calculations for all pixels of all N images for each color channel.

Figure 10:
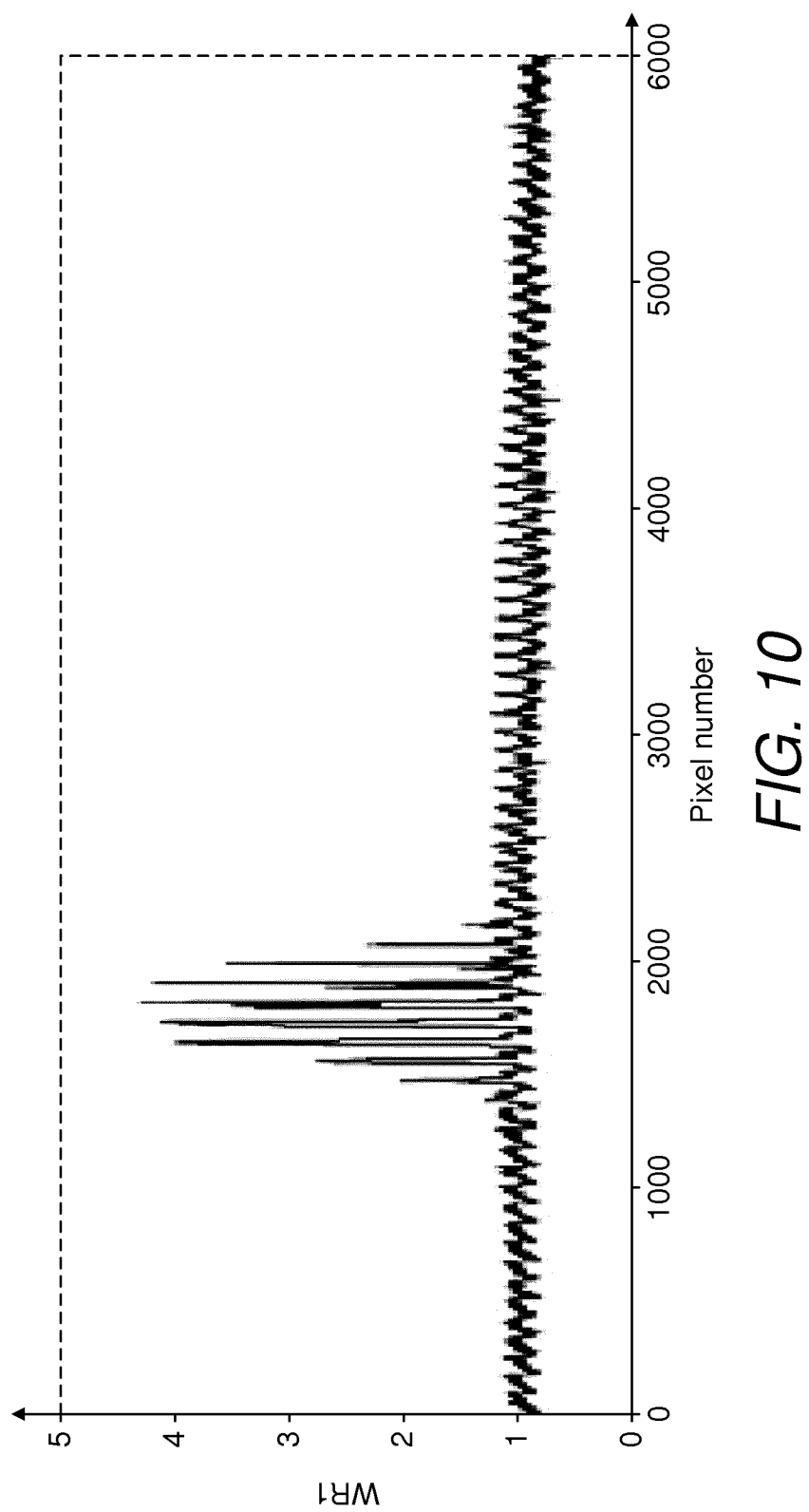
FIG. 10 shows a graph representing the ratios of pixel values of selected pixels of an image to other pixel values for corresponding pixels in other images for a specific color channel, according to an embodiment of the present invention.

FIG. 10 shows a representation of the ratio WR1 for image 1, as shown in FIG. 3, comprising 6000 pixels being identified with their respective location in image 1. In this example, the arithmetic mean is used to compute the mean value WR1 based on the three other images being used as reference images as shown in FIG. 4, FIG. 5 and FIG. 6. Thus, high values of WR1 correspond to a bright zone located between pixel 1500 to pixel 2000.

The weighting value W is associated with a threshold value V equal to 1 to compare the weighting value W with the threshold value V to determine in which situation the image associated with the weighting value contains a bright zone.

When the weighting value W is equal to the threshold value 1, this means that the intensity value of the same pixel in the two considered images is the same.

When the weighting value W is greater than the threshold value 1, this means that the pixel probably relates to a specular pixel.

When the weighting value W is lower than 1 for a specific pixel, this means that the pixel does not relate to a specular pixel.

When the weighting value W approaches the value 0, this means that the pixel probably relates to a dark zone.

The weighting value W may be associated with a specific margin value Vm, such as Vm_high for bright zones and Vm_low for dark zones to define two corresponding threshold intervals. Such threshold intervals enable specific bright zones and dark zones that may not be related to a specular zone or a shadow zone to be kept in the image. Indeed, such specific bright zones and dark zones may arise due to the interaction of illumination sources with the object caused by specific directions of illumination or the specific nature of the object, for example. Thus, when considering the threshold intervals, such specific zones are not considered as bright zones or dark zones to be corrected with the method of the present invention and remain unchanged in the image. Values of Vm_high and Vm_low are defined values such as Vm_high equals 0.2 and Vm_low equals 0.8.

The first threshold interval relates to the higher values of W that approach the value of 1 and indicate the absence of bright pixels. Based on the value of the margin value Vm_high, the first threshold interval relates to values of V from 1 to V_high, where V_high corresponds to predetermined values of V for bright pixels. In the present example, where Vm_high equals 0.2, the first threshold interval corresponds to values of V from 1 to 1+Vm_high, i.e. 1.2. Thus, when weighting values W are not equal to 1 and are included in the first threshold interval, this implies that related pixels are not considered as specular pixels. Thus, pixel values with a high intensity which may be generated by an effect of light due, for example, to the specific nature of the object, are considered for pixel correction but remain almost unchanged after pixel correction.

The second threshold interval relates to the lower values of W that approach the value of 0 and indicate the presence of dark pixels. Based on the value of the margin value Vm_low, the second threshold interval corresponds to values of V from V_low to 1, where V_low corresponds to predetermined values of V for dark pixels. In the present example where Vm_low equals 0.8, the second threshold interval corresponds to values of V from 1 to 1−Vm_low i.e. 0.2. Thus, when weighting values W are not equal to 1 and are included in the second threshold interval, this implies that related pixels are not considered as comprising any dark pixels corresponding to a dark zone. Thus, pixel values with a low intensity which may be generated by an effect of light due, for example, to the specific nature of the object or the Petri dish material, are considered for pixel value correction but remain almost unchanged after pixel correction.

The threshold value V represents a requirement to determine whether pixel value correction with the method of the present invention is needed.

The data processor 114 may compute a determined formula based on the above ratios, weighting values W and threshold values V to provide corrected pixel values or corrected intensities Ic to replace a determined pixel value I of a pixel under consideration, the formula may for example take the following form:

$$Ic(\text{im\_number}, \text{p\_number}) = \frac{I(\text{im\_number}, \text{p\_number})}{W_{\text{im\_number},\text{p\_number}}^{f(W_{\text{im\_number},\text{p\_number}})}}$$

where:
im_number is a subscripted reference for the corrected image from the plurality of N images;
p_number is a subscripted reference for the corrected pixel;
f(W) provides continuous correction with respect to bright pixels and dark pixels to be corrected. A sigmoid function may enable such continuity.
f(W) is a function such as the sigmoid function below and may represent a value higher than 0 and lower than 1:

$$f(W_{\text{im\_number},\text{p\_number}}) = \frac{k}{1 + e^{-\alpha * (W_{\text{im\_number},\text{p\_number}} - V)}}$$

where:
k is a coefficient related to the modulation of the level of correction as defined below;
V is the threshold value above described with threshold intervals;
α is a parameter defining the sharpness of transition of the sigmoid function;
W is the weighting value above described.

Figure 38:
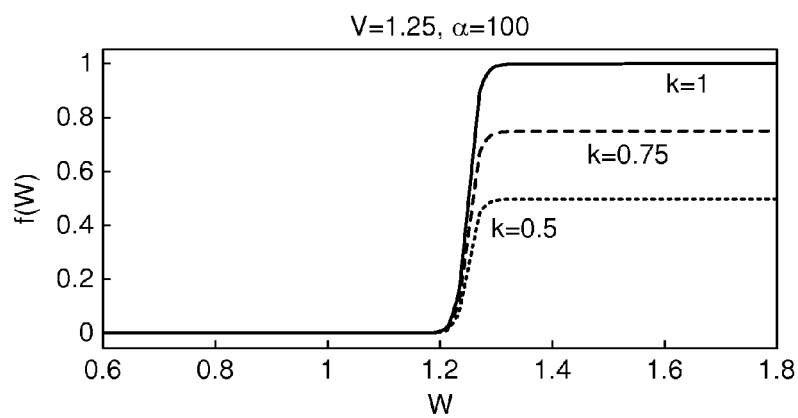
FIG. 38 shows three representations of f(W) with V=1.25 and α=100 being fixed values and where k=1,0.75 and 0.5, shown with different types of dotted lines, according to an embodiment of the present invention.

In the above formula, k is a predetermined coefficient for modulating the level of correction to modulate distortion caused by the pixel in question on the corrected image of the object and for modulating the level of the impact of the pixel correction on the other pixels within an image; the values of k are higher than 0 and lower than 1. A high value of k provides a significant correction of the pixel. Predetermined values of k such as k=0.75 for example, as shown in FIG. 38, for bright pixels and dark pixels may respectively refer to k_high and k_low.

Based on the above formula, when the weighting value W is relatively higher than the threshold value V, the function f(W) approaches the value of k which provides a correction of the related pixel value.

In a similar manner, when the weighting value W is relatively lower than the threshold value V, the function f(W) approaches the value 0 which provides a correction of the related pixel value which does not significantly change the pixel value.

Figure 39:
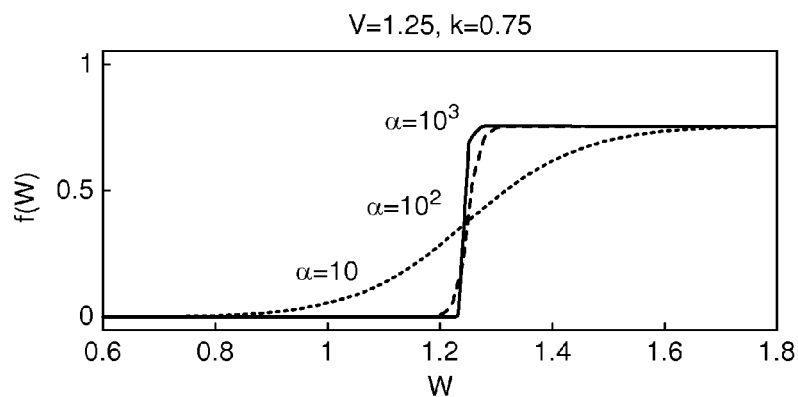
FIG. 39 shows three representations of f(W) with V=1.25 and k=0.75 being fixed values and where α=$10^3$, $10^2$ and 10, shown with different types of dotted lines, according to an embodiment of the present invention.

In the above formula, α is a parameter defining the sharpness of transition of the sigmoid function. This means that α may vary to modulate the correction to smooth the visible transition between corrected zones and non-corrected zones of an object in an image as shown in FIG. 39. The smoothness of the transition improves the visible effect of the correction on the image and also improves the quality of the image for a process such as a further photometric stereo process for object surface reconstruction. Predetermined values of α for bright pixels and dark pixels may be referred to as α_high and α_low respectively.

Based on the above distinctions for parameters α, k and V, the above general formula of f(W) may be written in a detailed manner as follows:

$$f(W) = \frac{k\_high}{1 + e^{-\alpha\_high(W-V\_high)}} - \frac{k\_low}{1 + e^{-\alpha\_low(W-V\_low)}} + k\_low$$

FIGS. 11, 37, 38 and 39 show different embodiments comprising a different set of values for parameters k, f(W), V_high and V_low, and α.

Figure 37:
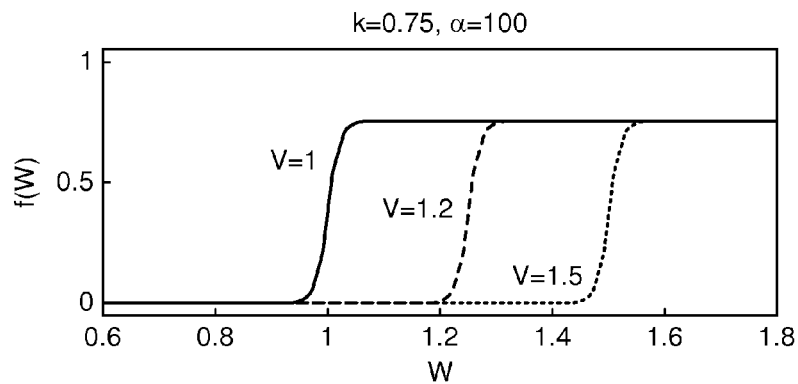
FIG. 37 shows three representations of f(W) with k=0.75 and α=100 being fixed values and where the threshold value V=1,1.2 and 1.5, shown with different types of dotted lines, according to an embodiment of the present invention.

FIG. 37 represents three dotted lines, each being related to a representation of f(W) with k=0.75 and α=100 being fixed values and where V=1, 1.2 and 1.5 to show the influence of V on f(W).

FIG. 38 represents three dotted lines, each being related to a representation of f(W) with V=1.25 and α=100 being fixed values and where k=1, 0.75 and 0.5 to show the influence of k of f(W).

Figure 11:
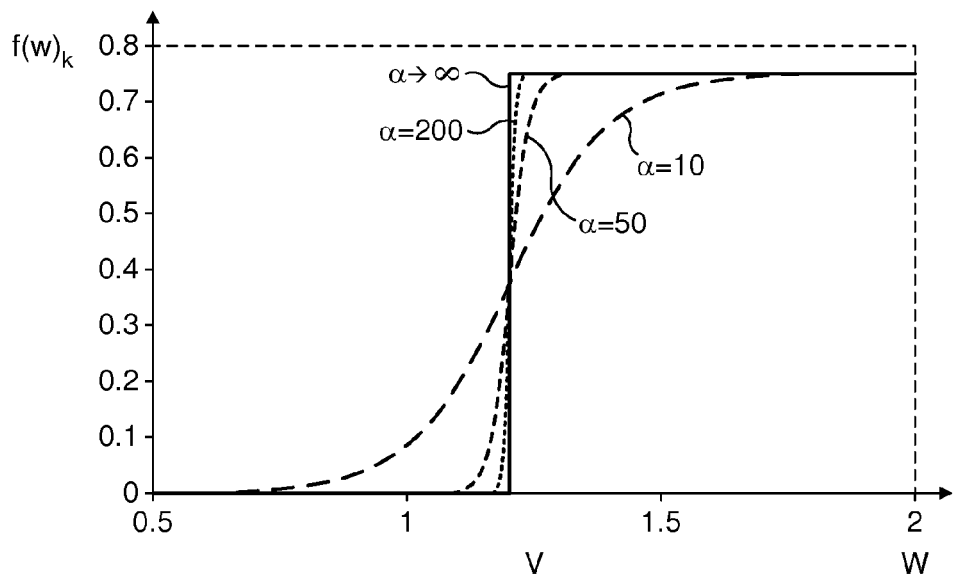
FIG. 11 shows a representation of a sigmoid function for removing bright zones from an image, according to an embodiment of the present invention.

FIG. 11 represents three dotted lines each being related to a representation of f(W) with V and k being fixed values and where α=$10^3$, $10^2$ and 10 to show the influence of α on f(W).

FIG. 39 represents three dotted lines, each being related to a representation of f(W) with V=1.25 and k=0.75 being fixed values and where α=$10^3$, $10^2$ and 10 to also show the influence of a on f(W).

Figure 12:
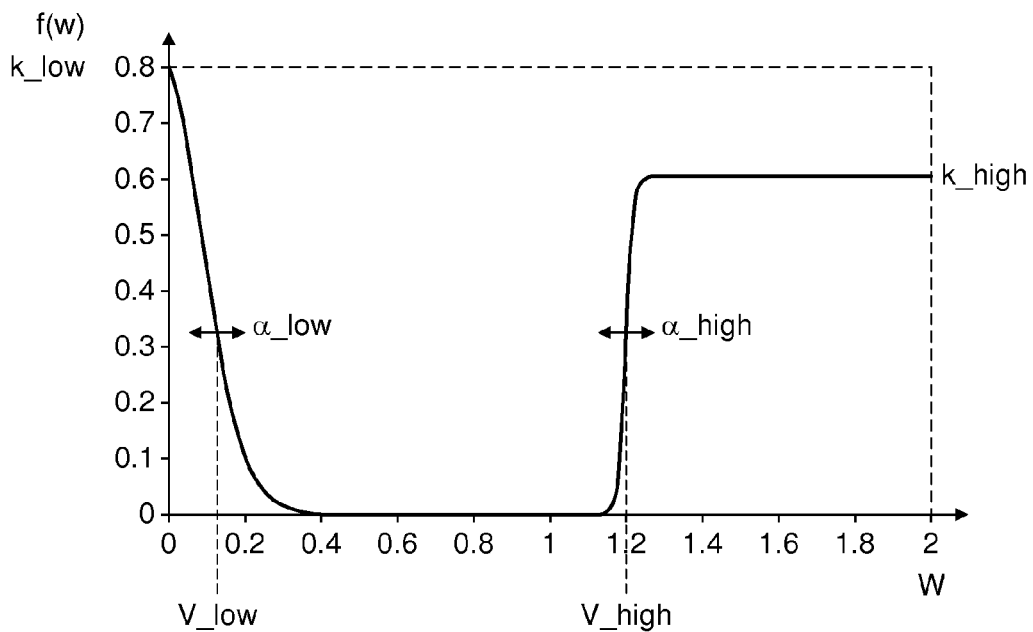
FIG. 12 shows a representation of a sigmoid function for simultaneously removing bright zones and dark zones from an image, according to an embodiment of the present invention.

FIG. 12 shows a representation of f(W) with different values of α and k associated with bright zones and dark zones, where α_high=100 and α_low=50 and k_high=0.6 and k_low=0.8.

Figure 13:
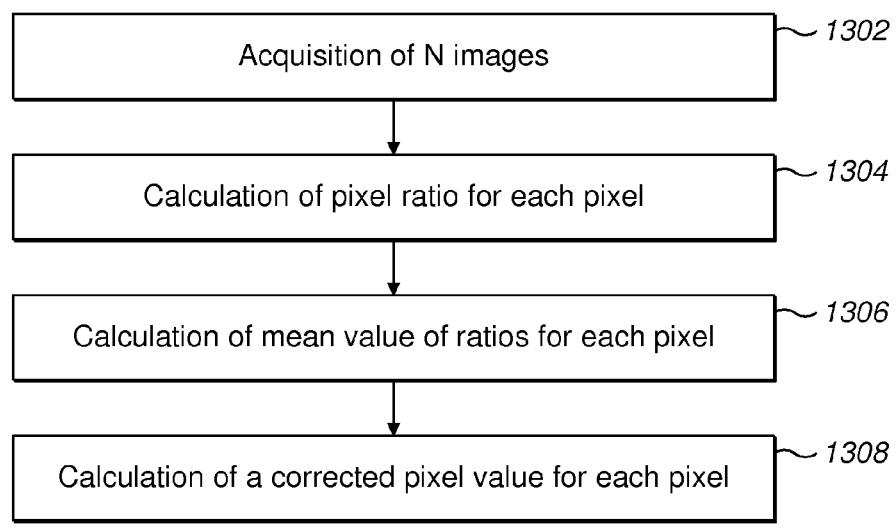
FIG. 13 shows the flowchart of the method, according to one aspect of the present invention.
Figure 14:
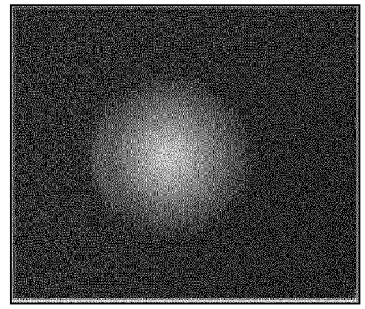
FIGS. 14, 15, 16 and 17 show several corrected images of the same object of FIGS. 3, 4, 5 and 6, each bright zone being corrected, according to an embodiment of the present invention.
Figure 15:
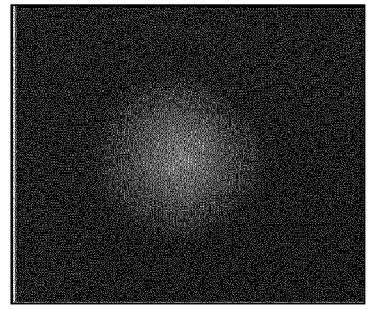
Figure 16:
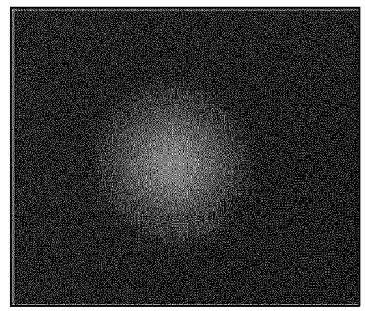
Figure 17:
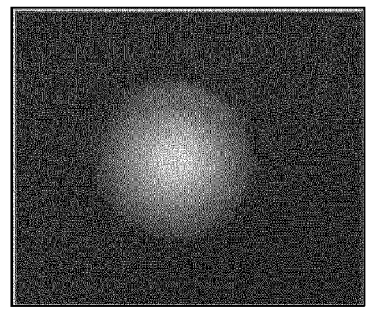

As shown in FIG. 13, the method of the present invention comprises several steps, 1302, 1304, 1306, and 1308, as described below. The method comprises step 1302 for the image capture device 108 to acquire a plurality of N images. In the described embodiment, at least two images must be taken with different illumination directions by different illumination sources.

In step 1302, the intensity detection device 112 considers each different image 1, 2 and 3 and detects the intensity of each pixel for each color channel to obtain the pixel values IR for each pixel, for each image and for each color channel.

In a step 1304, the data processor 114 calculates for a same pixel the ratio between the intensity of the pixel under consideration in an image and the intensity of the corresponding pixel in other images, for a same color channel to obtain the corresponding ratio values.

In a step 1306, the data processor 114 calculates the corresponding mean value of each calculated ratio for each pixel, for each image and each color channel.

In a step 1308, the data processor 114 calculates a corrected pixel value Ic based on the above formula, for each pixel in each image and for each color channel.

Figure 18:
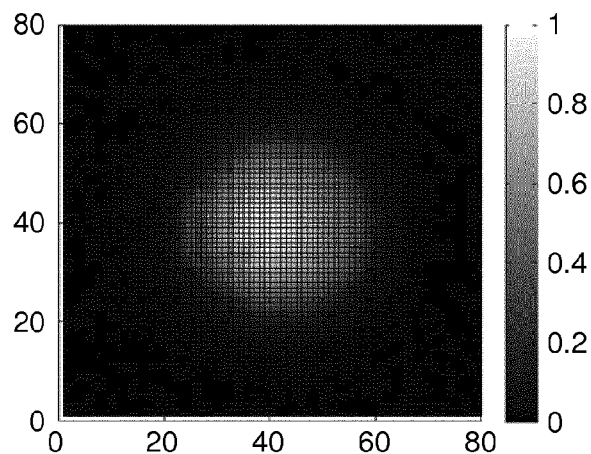
FIGS. 18, 19 and 20 respectively show a representation of FIG. 14 in Red/Green/Blue space, according to an embodiment of the present invention.
Figure 19:
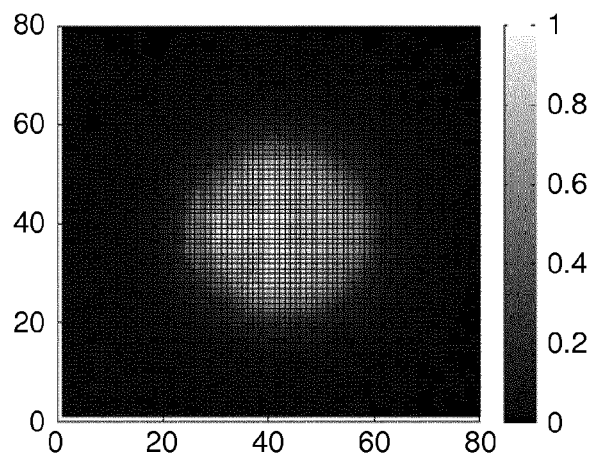
Figure 20:
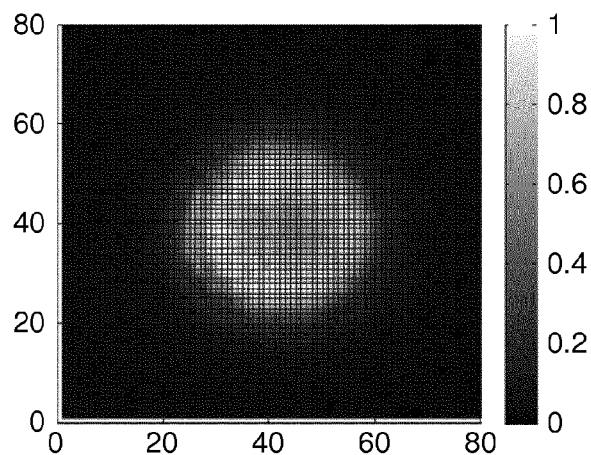

FIGS. 14, FIG. 15, FIG. 16 and FIG. 17 respectively show a corrected image of the object of FIG. 3, FIG. 4, FIG. 5 and FIG. 6 where the bright zone has been corrected in each image using the three other images as reference images for ratio estimation. The arithmetic mean has been used as a mean value for calculating W. FIGS. 18, 19 and 20 show the corrected image of FIG. 14 in the Red, Green and Blue channels respectively.

In the example of correction shown in FIGS. 18, 19 and 20, the above parameters k_high, k_low, V_high, V_low and α_high and α_low may be determined as indicated below:
k_high=k_low=0.75
V_high=1.2 and V_low=0.2
α_high=100 and α_low=50.
For strict correction, parameter V_high may equal 1.2.
For soft correction, parameter V_high may equal 1.2 and parameter α may equal 10 in combination with different values of k. When k=1, the correction appears to be maximal.

When k approaches 0, no correction is provided.

These values of parameters k_high, k_low, V_high, V_low and α_high and α_low are empirically determined based on the calculated mean value of the ratios. In all examples of the present specification, the set of parameters indicated above is used.

Figure 21:
FIG. 21 shows a representation of an object comprising bright zones.
Figure 26:
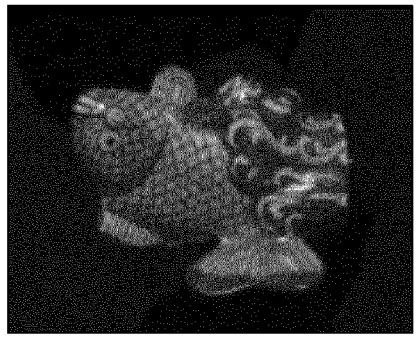
FIGS. 24, 25 and 26 show three different images of the same object wherein the object comprises specific bright zones and dark zones, according to an embodiment of the present invention.
Figure 25:
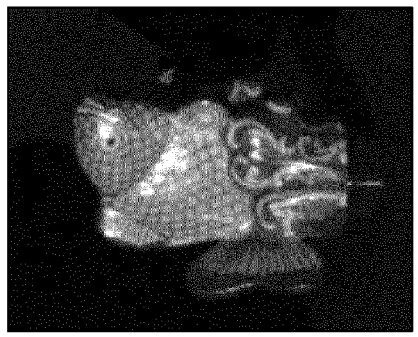
Figure 24:
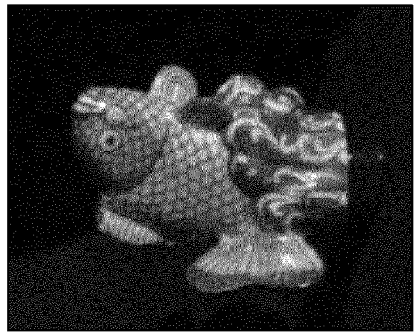

FIGS. 21 to 22 and 24 to 26 refer to images which are stored in a public database as mentioned in A. Hertzmann, S. M. Seitz, "Example-Based Photometric Stereo: Shape Reconstruction with General Varying BRDF", IEEE Transactions on pattern analysis and machine intelligence, vol 27, 8, p. 1254-1263, 2005. FIG. 21 corresponds to one of eight images of an object representing a cat and available in the public database. FIGS. 24, 25 and 26 correspond to three of the fourteen images of an object representing a fish that are available in the public database.

FIG. 21 shows an image of an object representing a cat with a plurality of bright zones.

Figure 22:
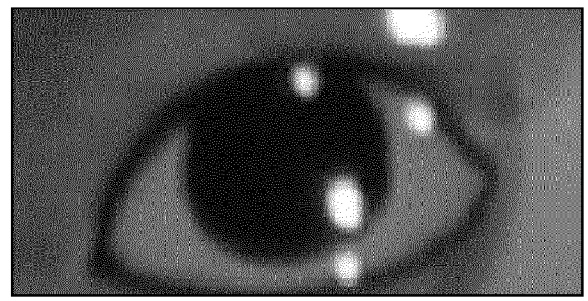
FIG. 22 shows a representation of a detail of the object shown in FIG. 21 wherein a plurality of bright zones is represented, according to an embodiment of the present invention.
Figure 23:
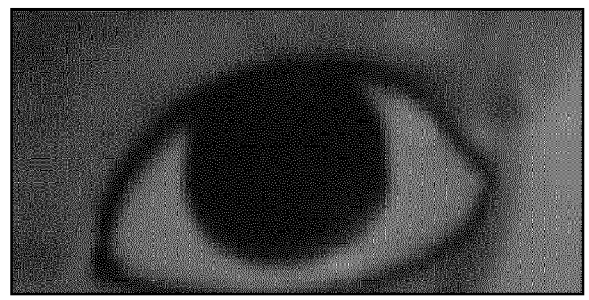
FIG. 23 shows a representation of a corrected image of the detail shown in FIG. 22, according to an embodiment of the present invention.

FIG. 22 shows specific bright zones located around and on the eye of the cat. After processing the image shown in FIG. 22 with the method of the present invention, a corrected image as shown in FIG. 23 is obtained. The method for obtaining the corrected image is carried out by using the other seven images of the cat as reference images. The arithmetic mean is used for calculating mean value W and the set of parameters k_high, k_low, V_high, V_low and α_high and α_low is the same as the one above mentioned. A visual check indicates that bright zones present in the image shown in FIG. 22 do not appear in the image shown in FIG. 23. In addition, a further visual check indicates that the details of FIG. 22 representing the eye of the cat have not been altered as a result of applying the method according to the invention.

Figure 29:
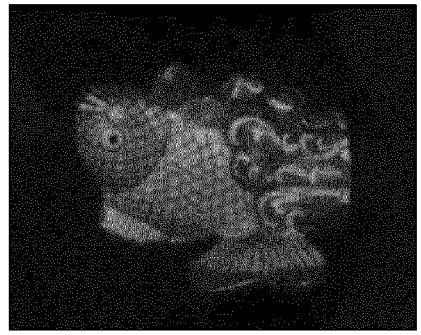
FIGS. 27, 28 and 29 respectively relate to corrected images of FIGS. 24, 25 and 26 respectively according to an embodiment of the present invention.
Figure 28:
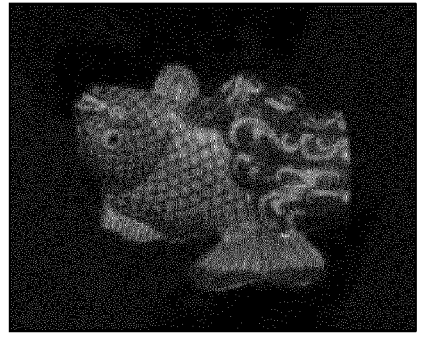
Figure 27:
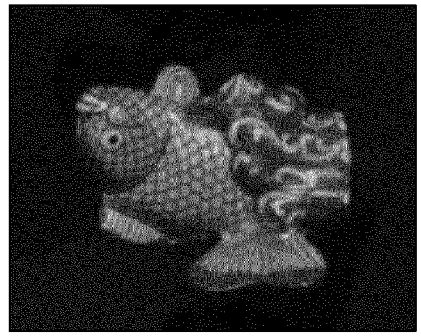

In other examples shown in FIGS. 24, 25 and 26, a plurality of bright zones and dark zones can be observed. As shown in FIGS. 27, 28 and 29, dark zones and bright zones have been removed by applying the method according to the invention. The method used for obtaining the corrected image consists of using the other thirteen images of the fish as reference images wherein the thirteen images differ from the image to be corrected. The arithmetic mean is used for calculating mean value W and the set of parameters k_high, k_low, V_high, V_low and α_high and α_low is the same as the one above mentioned. In addition, a visual check indicates that the details of the object have not been altered as a result of applying the method according to the invention.

Figure 30:
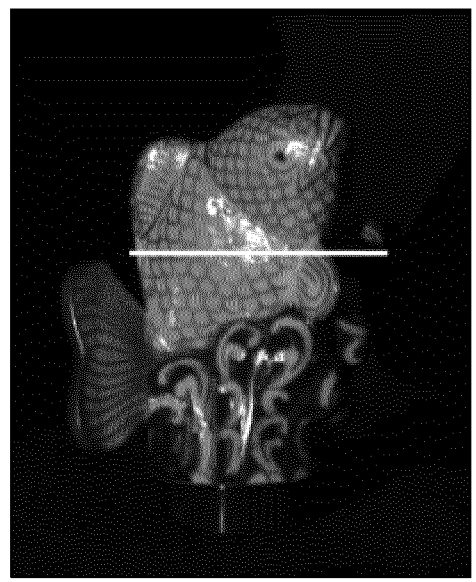
FIG. 30 shows a representation of an initial image I1 related to the Red color channel of the image shown in FIG. 25, according to an embodiment of the present invention.
Figure 31:
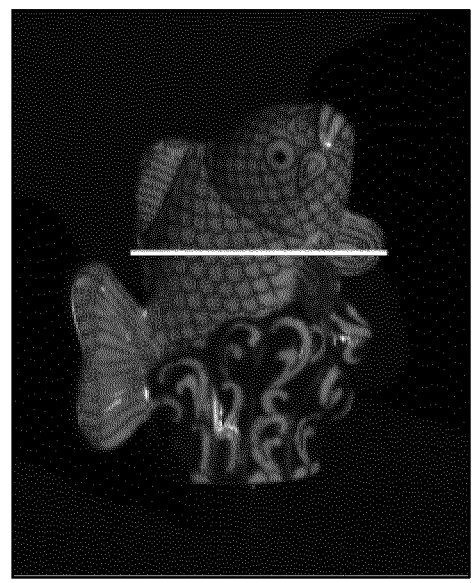
FIG. 31 shows a representation of a reference image I2 related to the Red color channel of the image shown in FIG. 26, according to an embodiment of the present invention.

In order to represent values of initial pixel values, W values, f(W) values and corrected pixel values, an example based on the images of FIG. 25 and FIG. 26 will now be described. One color channel such as the Red color channel is considered. Each Red color channel of the images of FIG. 25 and FIG. 26 is represented in FIG. 30 and FIG. 31 respectively. FIG. 30 and FIG. 31 show a white line representing a line of pixels of interest for illustration of values of W and f(W).

Figure 32:
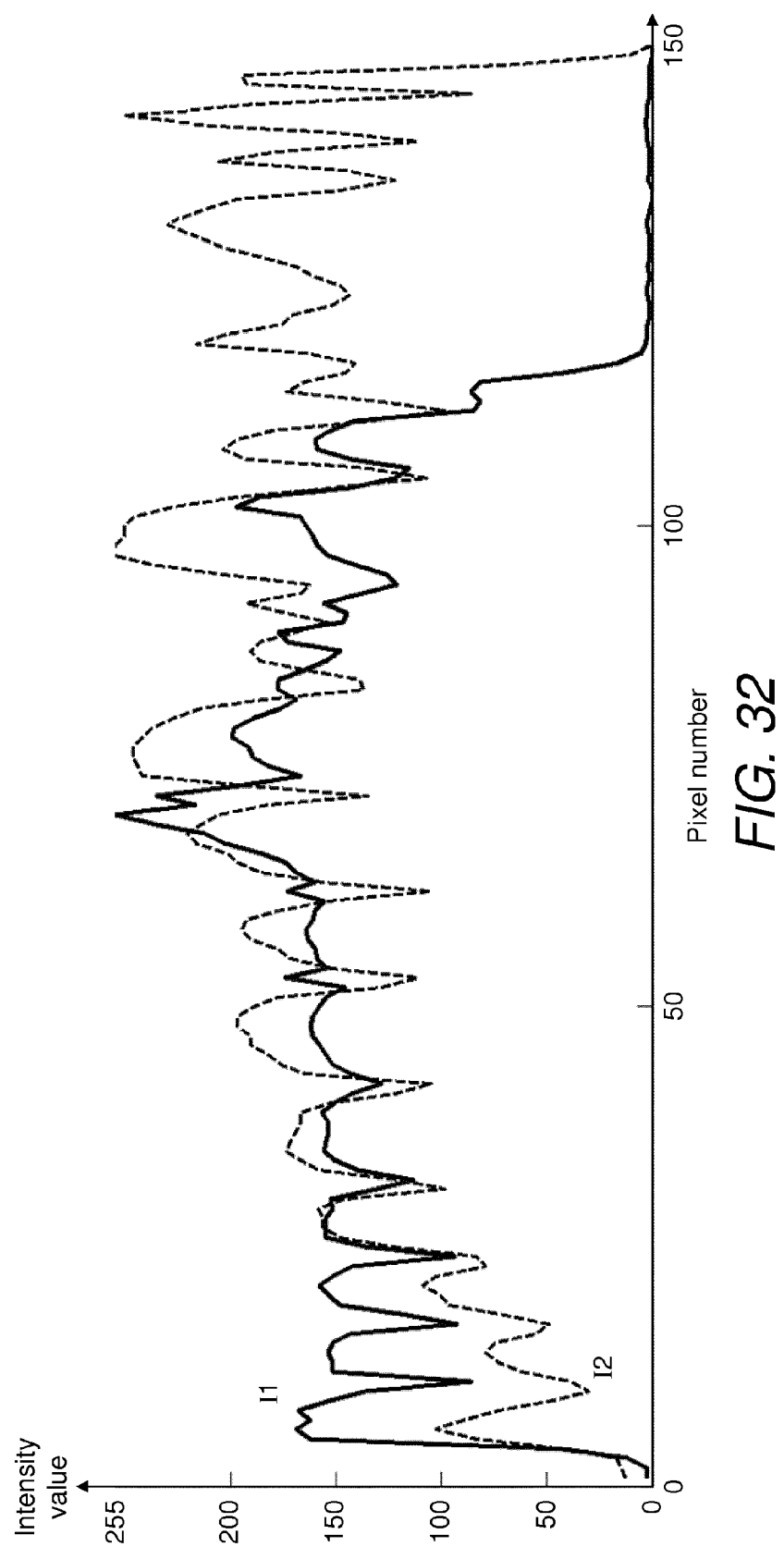
FIG. 32 shows a graph comprising a solid line representing intensity values or pixel values related to the line of pixels of interest for initial image I1 shown in FIG. 30 and a dashed line representing intensity values or pixel values related to the line of pixels of interest for reference image I2 shown in FIG. 31, according to an embodiment of the present invention.

FIG. 32 shows a graph representing the pixel values or intensity values for the line of pixels of interest for initial image I1 shown in FIG. 30 and reference image I2 shown in FIG. 31.

Figure 33:
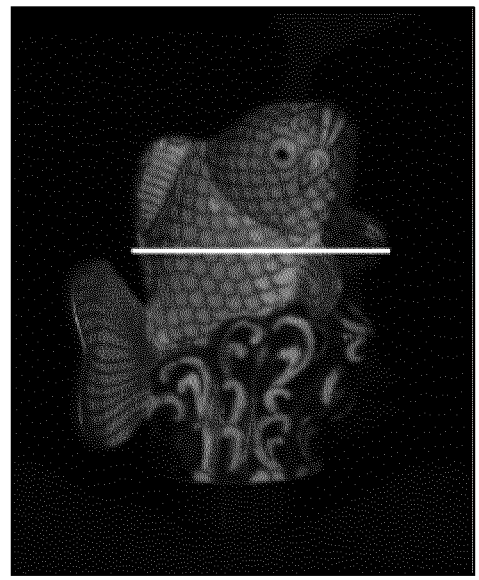
FIG. 33 shows a corrected image I1c of initial image I1 shown in FIG. 30 using reference image I2 shown in FIG. 31, according to an embodiment of the present invention.

FIG. 33 represents the corrected image I1c of initial image I1 in FIG. 30 using reference image I2 on FIG. 31. The mean value W is calculated using one reference image shown in FIG. 31. Thus, the mean value is equal to the ratio of initial image I1 shown in FIG. 30 and reference image I2 shown in FIG. 31.

Figure 34:
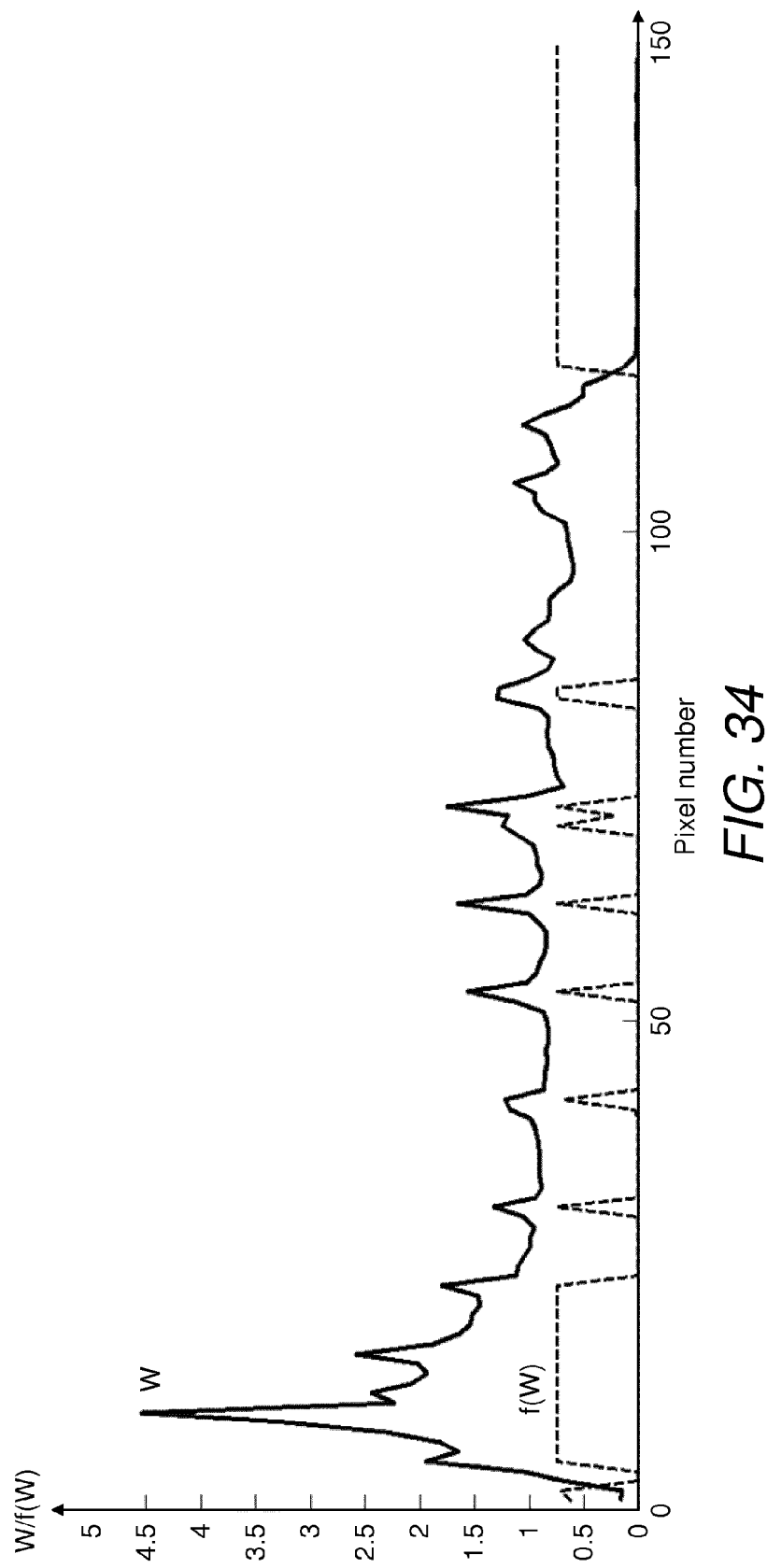
FIG. 34 shows a graph comprising a solid line representing the mean value W and a dashed line representing the corrected function f(W) for initial image I1 shown in FIG. 30 and reference image I2 shown in FIG. 31, according to an embodiment of the present invention.

FIG. 34 shows a graph representing the mean value W and the corrected function f(W). f(W) is calculated using the same parameters k_high, k_low, V_high, V_low and α_high and α_low as above mentioned. FIG. 34 shows values of f(W) as being not equal to zero, which indicate pixels to be corrected. The values correspond to both bright zones, i.e. relatively high values of W, and dark zones, i.e. relatively low values of W.

Figure 35:
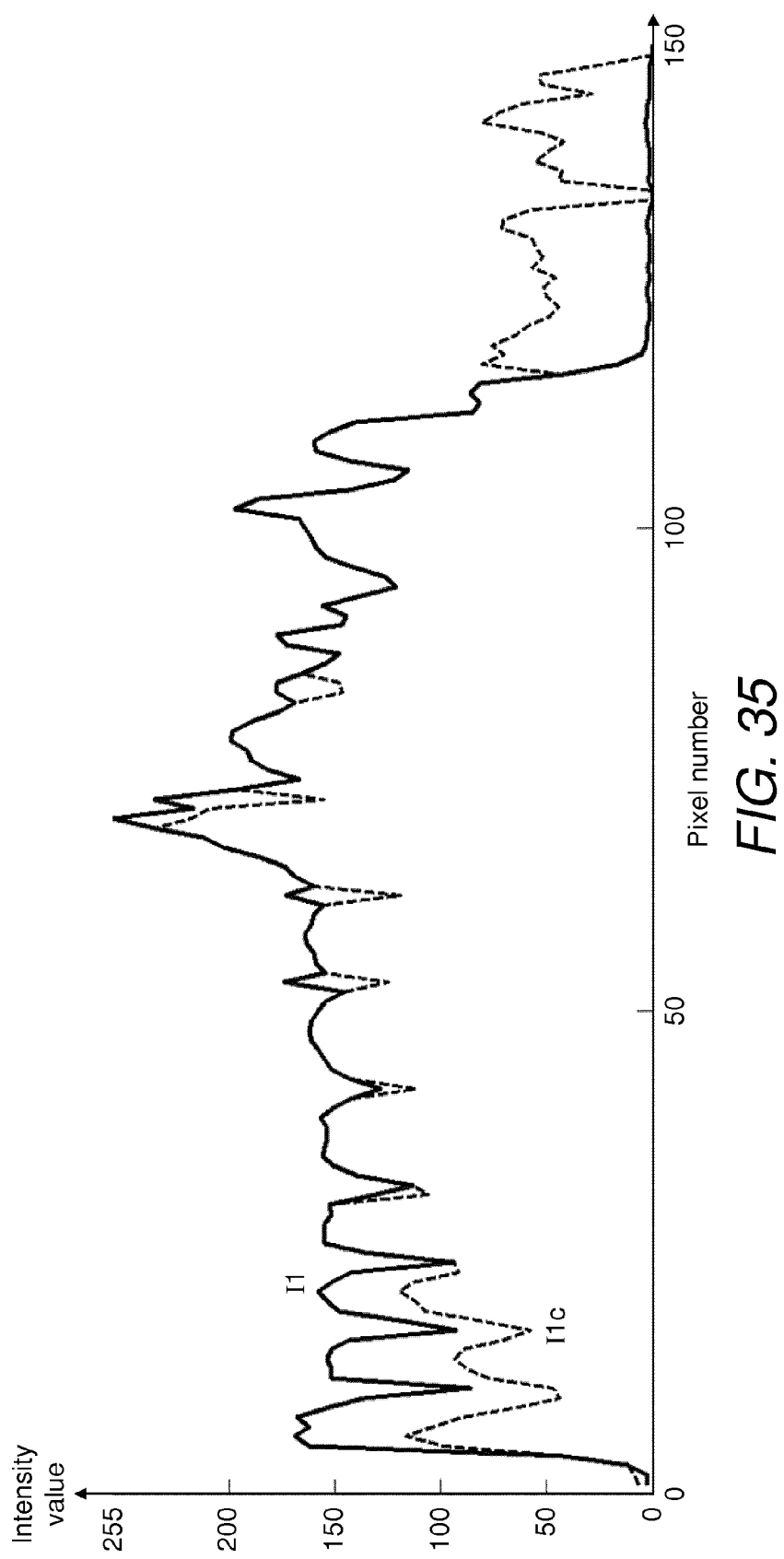
FIG. 35 shows a graph comprising a solid line representing intensity values or pixel values for the line of pixels of interest for initial image I1 shown in FIG. 30 and a dashed line representing intensity values of pixel values for the line of pixels of interest for the corrected image I1c shown in FIG. 33, according to an embodiment of the present invention.

FIG. 35 shows a graph representing the pixels values for the line of pixels of interest for initial image I1 shown in FIG. 30 and the corrected image I1c shown in FIG. 33.

Figure 36:
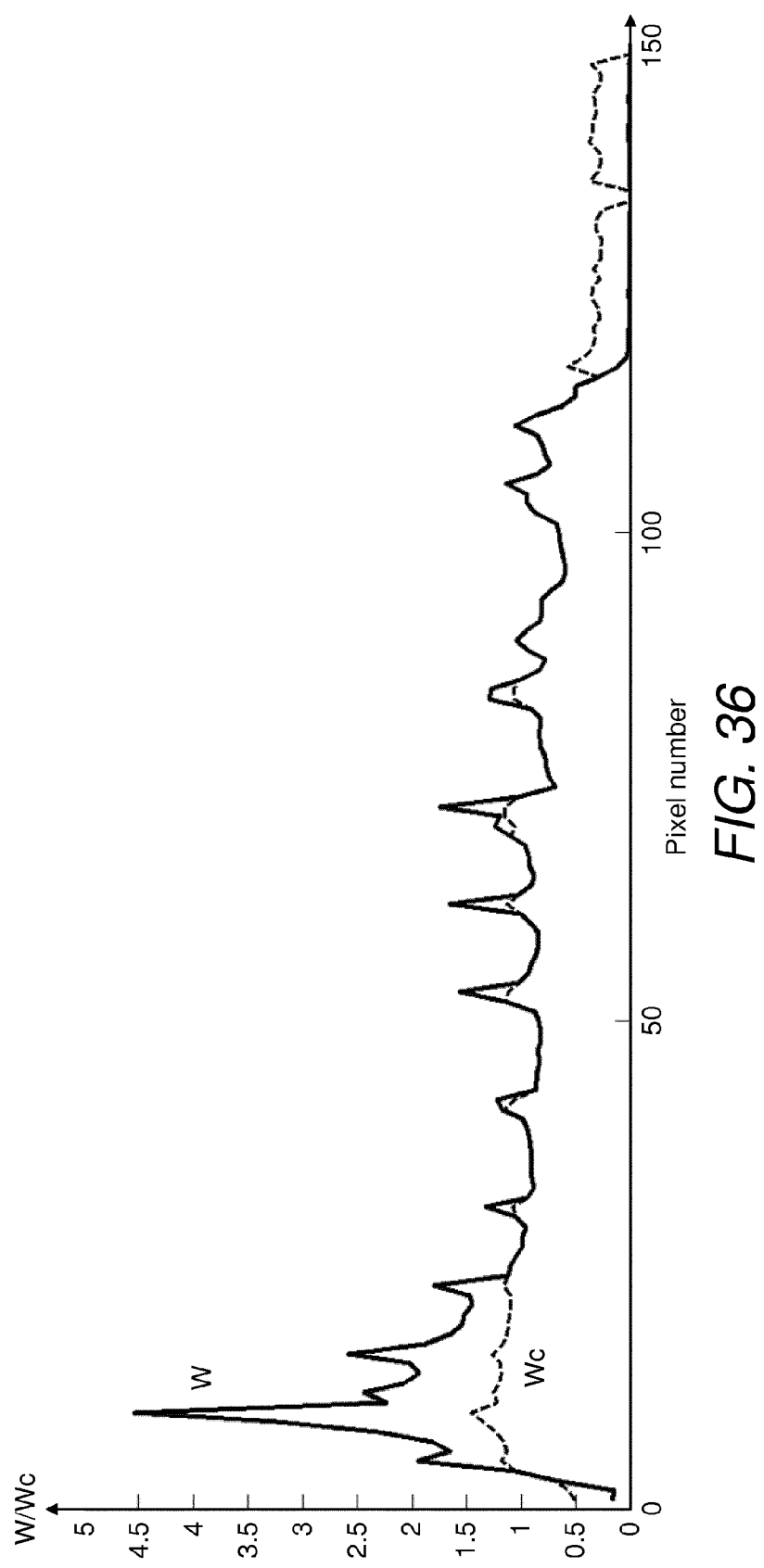
FIG. 36 shows a graph comprising a solid line representing the mean value W estimated as the ratio of initial image I1 shown in FIG. 30 and reference image I2 shown in FIG. 31 and a dashed line representing the corrected mean value We estimated as being the ratio of corrected image I1c as shown in FIG. 33 and reference image I2 as shown in FIG. 31, according to an embodiment of the present invention.

FIG. 36 shows a graph representing the mean value W estimated as the ratio of initial image I1 shown in FIG. 30 and reference image I2 shown in FIG. 31 and the corrected mean value Wc estimated as being the ratio of corrected image I1c shown in FIG. 33 and reference image I2 shown in FIG. 31.

As shown in FIG. 35, the intensity value of bright zones in corrected image I1c is lower than the intensity value of bright zones in image I1 as shown in FIG. 32. In a similar manner, as shown in FIG. 35, the intensity value of dark zones in corrected image I1c is higher than the intensity value of dark zones in image I1 as shown in FIG. 32. In addition, intensity values of pixels characterizing object texture and surface remain unchanged for corrected image I1c in FIG. 35 when compared with the intensity value of some pixels in image I1 as shown in FIG. 32.

It can be noted that some zones which are bright or dark on both initial image I1 and reference image I2 are not detected and thus not corrected. As a result, values of intensity of these zones remain abnormally high or low respectively. However, the use of more reference images with bright or dark zones which do not totally overlap each other optimizes the method of the present invention which is at least directed to avoid such misdetection.

Alternatively, instead of determining specific values for the above parameters, an automatic system for adapting the values of the parameters may be implemented.

The location of specular zones on each image is of significant importance to improve the quality of the corrected image with the method according to the present invention. Indeed, as already mentioned, each specular zone, i.e. bright zone or dark zone, should not totally overlap another specular zone to provide a corrected image of improved quality.

Figure 59:
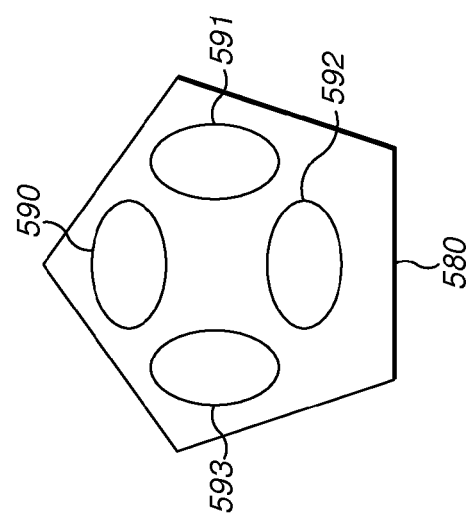
FIG. 59 represents a schematic view of a superimposition of four images, wherein each image comprises a specular zone and wherein no specular zone overlaps another one, according to an embodiment of the present invention.

Thus, FIG. 59 represents a schematic view of a superimposition of four images of an object 580, wherein image 1 comprises a specular zone 590, image 2 comprises a specular zone 591, image 3 comprises a specular zone 592 and image 4 a comprises specular zone 593. No specular zone overlaps another. The method according to the present invention provides the best results with specular zones being located as in FIG. 59.

Figure 60:
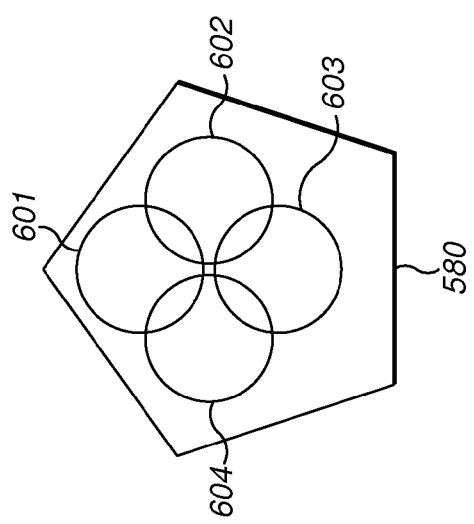
FIG. 60 represents a schematic view of a superimposition of four images, wherein each image comprises a specular zone and wherein all specular zones partially overlap at least another one, according to an embodiment of the present invention.

FIG. 60 represents a schematic view of a superimposition of four images of the object 580, wherein image 1 comprises a specular zone 601, image 2 comprises a specular zone 602, image 3 comprises a specular zone 603 and image 4 comprises a specular zone 604. Each of specular zones 601, 602, 603 and 604 partially overlaps at least another specular zone.

Figure 61:
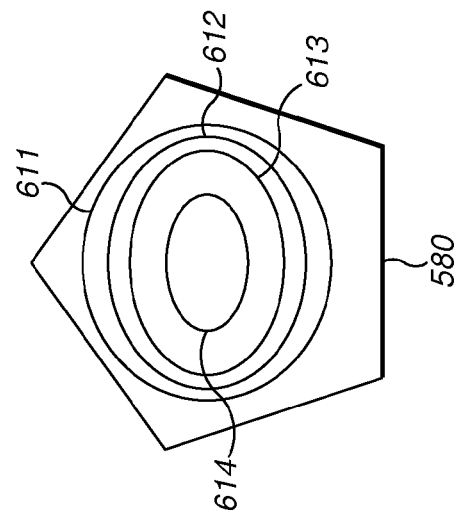
FIG. 61 represents a schematic view of a superimposition of four images, wherein each image comprises a specular zone and wherein at least one specular zone totally overlaps another one.

FIG. 61 represents a schematic view of a superimposition of four images of the object 580, wherein image 1 comprises a specular zone 611, image 2 a comprises specular zone 612, image 3 comprises a specular zone 613 and image 4 comprises a specular zone 61. At least specular zone 611 totally overlaps specular zones 612, 613 and 614.

Figure 40:
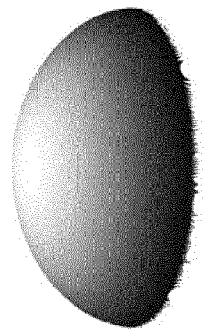
FIG. 40 represents an artificial surface of an object captured with different illumination directions, according to an embodiment of the present invention.

FIG. 40 represents an artificial surface of an object captured with different illumination directions.

Figure 41:
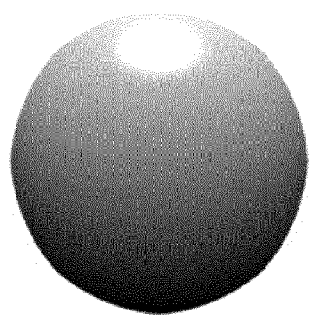
FIG. 41 represents one of the initial images where correction of a bright zone is required, according to an embodiment of the present invention.

FIG. 41 represents one of the initial images where correction of a bright zone is required.

Figure 42:
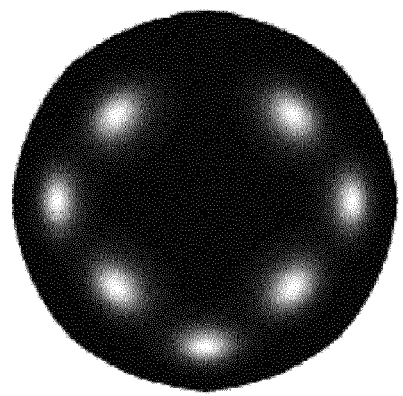
FIG. 42 represents an artificial image made of a superimposition of the specular components of seven images corresponding to seven evenly spatially distributed illumination sources, according to an embodiment of the present invention.

FIG. 42 represents an artificial image made of a superimposition of the specular components of seven images corresponding to seven evenly spatially distributed illumination sources.

Figure 43B:
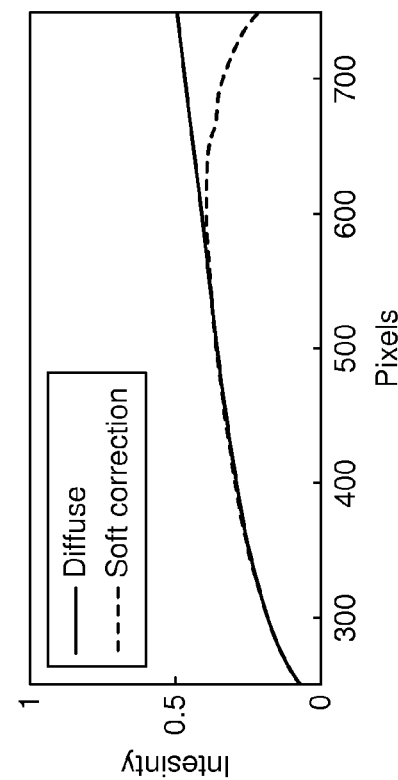
FIG. 43b represents the distribution of pixels intensities along the horizontal white line shown in FIG. 43a, for the diffuse component and for the result of the soft correction, according to an embodiment of the present invention.
Figure 43A:
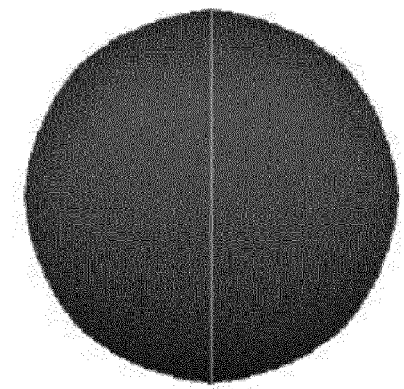
FIG. 43a represents a corrected image of FIG. 41 using seven reference images acquired from seven evenly spatially distributed illumination sources, according to an embodiment of the present invention.

FIG. 43a represents a corrected image of FIG. 41 using seven reference images acquired from seven evenly spatially distributed illumination sources.

FIG. 43b represents the distribution of pixels intensities along the horizontal white line shown in FIG. 43a, for the diffuse component in solid line and for the resulting component based on the soft correction in dotted line. As the bright zones are evenly located, the quality of the corrected image is satisfactory. This is shown by the resulting component following the diffuse component on the graph of FIG. 43b. In addition, there is no specific impact on zones that do not require correction.

Figure 44:
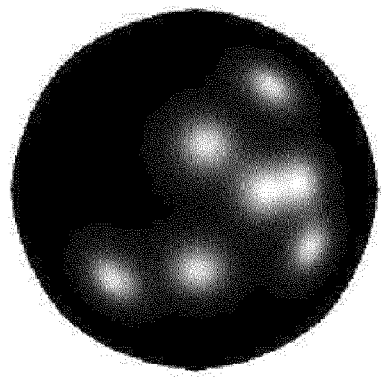
FIG. 44 represents an artificial image made of a superimposition of the specular components of seven images corresponding to seven randomly spatially distributed illumination sources, according to an embodiment of the present invention.

FIG. 44 represents an artificial image made of a superimposition of the specular components of seven images corresponding to seven randomly spatially distributed illumination sources.

Figure 45B:
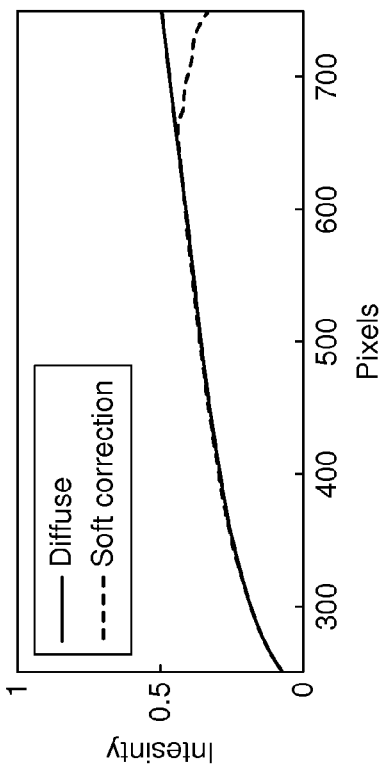
FIG. 45b represents the distribution of pixels intensities along the horizontal white line shown in FIG. 45a, for the diffuse component and for the result of the soft correction, according to an embodiment of the present invention.
Figure 45A:
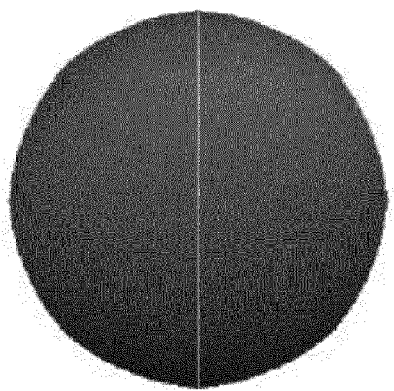
FIG. 45a represents a corrected image of FIG. 41 using seven reference images acquired from seven randomly spatially distributed illumination sources, according to an embodiment of the present invention.

FIG. 45a represents a corrected image of FIG. 41 using seven reference images acquired from seven randomly spatially distributed illumination sources.

FIG. 45b represents the distribution of pixels intensities along the horizontal white line shown in FIG. 45a, for the diffuse component in solid line and for the resulting component based on the soft correction in dotted line. The quality of the corrected image is also satisfactory when illumination sources are randomly located.

Figure 46:
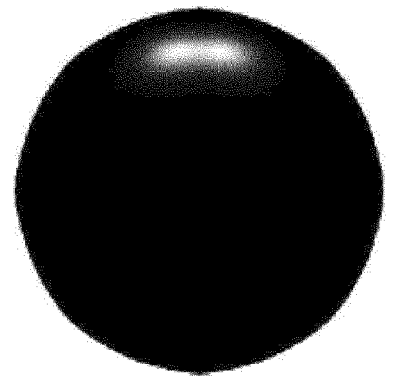
FIG. 46 represents an artificial image made of a superimposition of the specular components of seven images corresponding to seven closely located illumination sources, according to an embodiment of the present invention.

FIG. 46 represents an artificial image made of a superimposition of the specular components of seven images corresponding to seven closely located illumination sources.

Figure 47B:
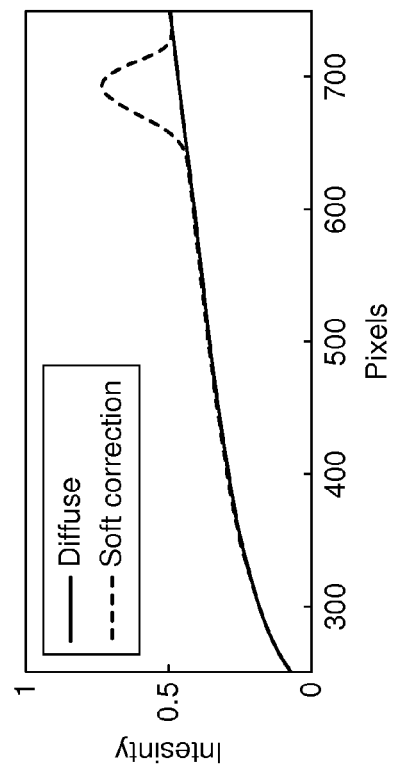
FIG. 47b represents the distribution of pixels intensities along the horizontal white line shown in FIG. 47a, for the diffuse component and for the result of the soft correction, according to an embodiment of the present invention.
Figure 47A:
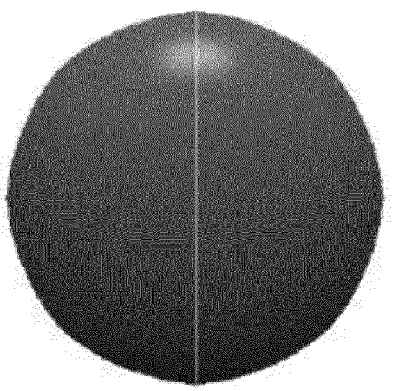
FIG. 47a represents a corrected image of FIG. 41 using seven reference images acquired from seven closely located illumination sources, according to an embodiment of the present invention.

FIG. 47a represents a corrected image of FIG. 41 using seven reference images acquired from seven closely located illumination sources.

FIG. 47b represents the distribution of pixels intensities along the horizontal white line shown in FIG. 47a, for the diffuse component in solid line and for the resulting component based on the soft correction in dotted line. As bright zones shown in FIG. 46 overlap, the correction process may not be completed. Indeed, overlapping bright zones may not be detected as being a zone having an incorrect intensity.

Figure 48:
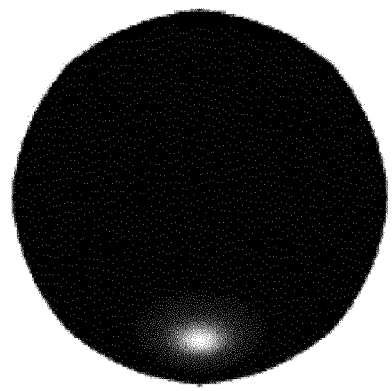
FIG. 48 represents the specular component of one image corresponding to an illumination source opposite to the specular zone to be corrected, according to an embodiment of the present invention.

FIG. 48 represents the specular component of one image corresponding to an illumination source opposite to the specular zone to be corrected.

Figure 49B:
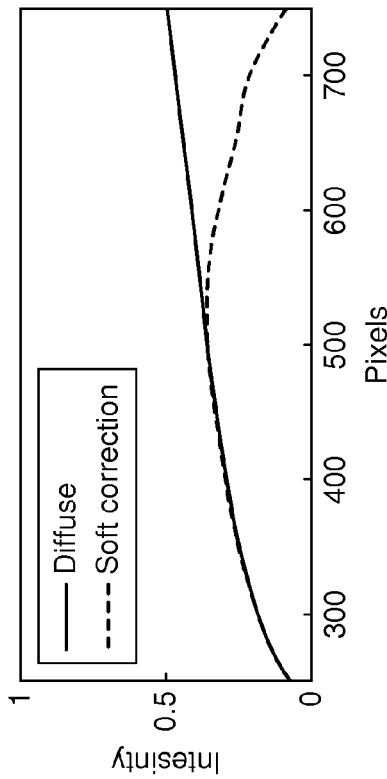
FIG. 49b represents the distribution of pixels intensities along the horizontal white line shown in FIG. 49a, for the diffuse component and for the result of the soft correction, according to an embodiment of the present invention.
Figure 49A:
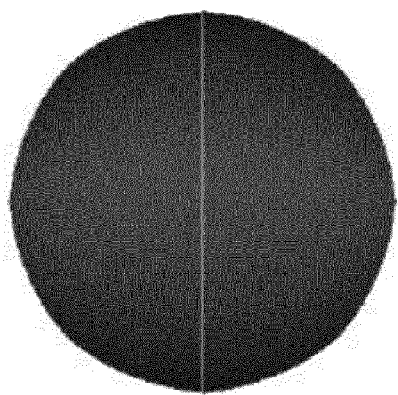
FIG. 49a represents a corrected image of FIG. 41 using one reference image acquired from one illumination source opposite to the specular zone to be corrected, according to an embodiment of the present invention.

FIG. 49a represents a corrected image of FIG. 41 using one reference image acquired from one illumination source opposite to the specular zone to be corrected.

FIG. 49b represents the distribution of pixels intensities along the horizontal white line shown in FIG. 49a, for the diffuse component in solid line and for the resulting component based on the soft correction in dotted line. The corrected image is of good quality, though the general distribution of light on the object surface is not obtained.

Figure 50:
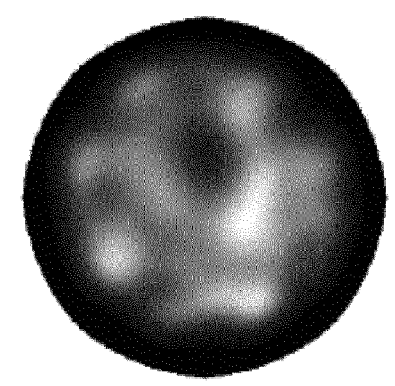
FIG. 50 represents an artificial image made of a superimposition of the specular components of ninety-nine images corresponding to ninety-nine randomly spatially distributed illumination sources, according to an embodiment of the present invention.

FIG. 50 represents an artificial image made of a superimposition of the specular components of ninety-nine images corresponding to ninety-nine randomly spatially distributed illumination sources.

Figure 51B:
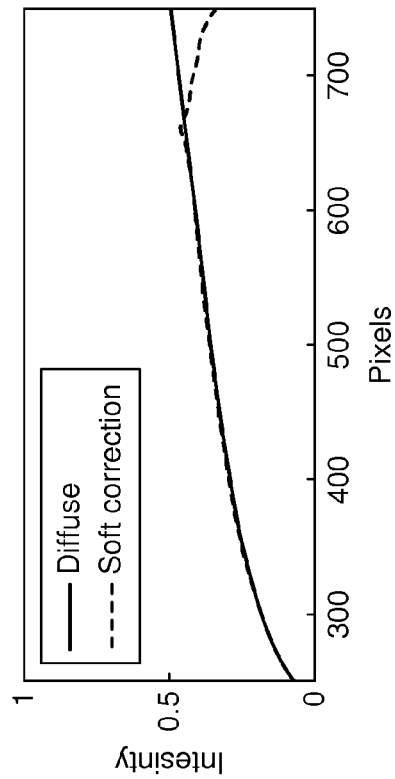
FIG. 51b represents the distribution of pixels intensities along the horizontal white line shown in FIG. 51a, for the diffuse component and for the result of the soft correction, according to an embodiment of the present invention.
Figure 51A:
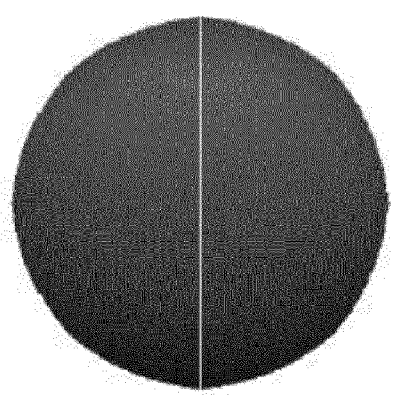
FIG. 51a represents a corrected image of FIG. 41 using ninety-nine reference images acquired from ninety-nine randomly spatially distributed illumination sources, according to an embodiment of the present invention.

FIG. 51a represents a corrected image of FIG. 41 using ninety-nine reference images acquired from ninety-nine randomly spatially distributed illumination sources.

FIG. 51b represents the distribution of pixels intensities along the horizontal white line shown in FIG. 51a, for the diffuse component in solid line and for the resulting component based on the soft correction in dotted line. The corrected image is of improved quality.

Thus, the best results for correction of images are obtained when considering a significant number of images randomly or evenly spatially distributed.

It appears that using two initial images acquired with opposite light source directions results in bright zones that are located at a remote distance from one another. Accordingly, weighting value W as previously defined applies in an optimal manner and the corrected image is of improved quality.

When using a plurality of initial images such as a dozen images acquired with close light source directions, artifacts and total or partial overlapping zones of bright zones may appear. Thus, weighting value W as previously defined may not correctly detect bright zones or correct such bright zones in an efficient manner.

FIGS. 52a, 52b, 52c and 52d represent four initial images of a circular object comprising bright zones at different locations without any overlapping zones.

FIGS. 53a, 53b, 53c and 53d represent images of the circular object where bright zones have been corrected using the well-known inpainting process.

FIGS. 54a, 54b, 54c and 54d represent corrected images of the circular object after application of the method of the present invention using soft correction. It appears that corrected images of FIGS. 54a, 54b, 54c and 54d are of an improved quality when compared with corresponding corrected images 53a, 53b, 53c and 53d obtained with the well-known inpainting process.

A schematic comparison may be provided to compare prior art processes for removing specular zones on images of an object comprising several circular lines.

FIG. 55 shows a schematic view of contour lines of the surface of the circular object after a surface reconstruction process with no correction of bright zones. It appears that some circular lines are stretched.

FIG. 56 shows a schematic view of contour lines of the surface of the circular object after reconstruction with an inpainting process known in the prior art. It appears that some circular lines are still stretched. The corrected image is of poor quality.

FIG. 57 shows a schematic view of contour lines of the surface of the circular object using the well-known algorithm of Coleman and Jain known in the prior art. Circular lines are stretched and modified in a significant manner. The corrected image is of poor quality.

FIG. 58 shows a schematic view of contour lines of an object after a reconstruction process obtained using the method of the invention where parameters are V_high=1.2, k_high=k_low=0.5 and α_high=α_low=10.

As shown in FIG. 58, circular lines are not stretched and the distance between each circular line remains constant. The method for removing specular zones according to the present invention provides best results.

The first embodiment comprising $$W = \sum_{j=1}^{p} c_j \frac{I}{I_{refj}} \text{ and}$$

$$f(W_{im\_number,p\_number}) = \frac{k}{1 + e^{-\alpha*(W_{im\_number,p\_number}-V)}}$$

operates within the algorithm below:

Algorithm 1: Soft specularity correction algorithm.

1: In:
   I - image to be corrected;
   M - number of pixels in image I;
   $\{I_{ref}\}$ - sequence of reference images;
   p - number of reference images;
   k, α, V - sigmoid function parameters.
2: Out:
   $I_c$ - image with corrected specular zones.
3: for p_number = 1, . . . , M do
4:   for l = 1, . . . , p do
5:     $IR^l$(p_number) ← I(p_number)/$I_{ref}^l$(p_number)
6:   end for
7:   WR(p_number) ← AggregRatio(IR(p_number))
8:   $$f(p\_number) \leftarrow \frac{k}{1 + s^{-\alpha(WR(p\_number)-V)}}$$
9:   $I_c$(p_number) ← I(p_number)/W(p_number)$^{f(p\_number)}$
10: end for The first embodiment above described provides results with enhanced quality in the situation where the user may define the adapted settings for each parameter k, V and α based on the sets of reference images.

In a second embodiment, the weighting value W is calculated as defined below:

$$W_{p\_number} = \sum_{i=1}^{p} c_l \left( \frac{I(p\_number)}{I_{ref}^l(p\_number)} - LinApprox(I, I_{ref}^l) + 1 \right),$$

Based on W being calculated in the second embodiment, f(W) now relates to an adaptive correction only based on values of parameter α.

I relates to the pixel intensities of the image to be corrected. In the second embodiment, the number of images im_number=1 and can thus be disregarded in further notations. When the image is unwrapped, i.e. vectorized, each pixel in the image I is referred to as I(p_number). In addition, in the present description of the second embodiment, image I and images used for correction are assumed to be gray-scaled, i.e. single-channel images. Thus, there is no need to use IR, IG and IB notations. Image I is the sole variable representation used in the algorithms. A set of p reference images is also used for correcting image I, image $\{I_{ref}\}$ taken from the same fixed camera position and at different light source positions. For example, when the initial set of images comprises 3 images $I_1, I_2, I_3$, a first correction of the image I=$I_1$ is associated with a set of reference images $\{I_{ref}\}=\{I_2, I_3\}$. In a similar manner, a second correction of the image I=$I_2$ is associated with a set of reference images $\{I_{ref}\}=\{I_1, I_3\}$. In a similar manner, a third correction of the image I=$I_3$ is associated with a set of reference images $\{I_{ref}\}=\{I_1, I_2\}$. Reference images may correspond to all other images of the initial sequence with the exception of the image to be corrected. General light source distribution or location for each image I can be seen as a low frequency component and roughly approximated to an additional plane of intensities. The orientation of the plane and the corresponding translation depends on the position and the intensity of the light source. If the image I has basic shading, then relative light shading of each image $I_{ref}^1$, $\forall l \in [1, p]$ may be represented as a linear approximation, called LinApprox as detailed below, of the matrix of ratio values IR_ratio=I Ø $I_{ref}^1$, where 'Ø' relates to the point-topoint division. Thus, when subtracting the approximated plane from the evaluated values of IR_ratio, the general shading is removed when there is no specular zone, value of this subtraction tends to zero.

LinApprox(I, $I_{ref}^1$) is an approximation of the matrix of ratio values $$\left( \frac{I(\text{p\_number})}{I_{ref}^l(\text{p\_number})} \right)$$

by a plane using linear or robust regression coefficients. $c_1$ denotes weight of image ratios for generalized mean values. The coefficients of the linear approximation may be obtained by minimizing the following error:

$$\min_{a_0, a_1, a_2} \left\| \frac{I(\text{p\_number})}{I_{ref}^l(\text{p\_number})} - (a_0 + a_1 x + a_2 y) \right\|_2^2.$$

where $\alpha_0, \alpha_1, \alpha_2$ are the coefficients of the equation defining the approximated plane.

Adding one to the residual between ratio value and approximated plane provides a possibility to operate with W as with a simple ratio. The closer the value of W(p_number) is to 1, the less the difference between I(p_number) and $I_{ref}^1$(p_number).

Application of the evaluated adaptive ratio eliminates the need to use threshold V in this second embodiment. The approximated plane obtained, LinApprox (I, $I_{ref}^1$), may be seen as a matrix of threshold values appropriate to each pixel (p_number) and for each reference image 1. The corrected image pixel $I_c$(p_number) can be evaluated as:

$$I_c(\text{p\_number}) = \frac{I(\text{p\_number})}{W(\text{p\_number})^{g(\text{p\_number})'}}$$

where $$g(\text{p\_number}) = \frac{k}{1 + e^{-\alpha W(\text{p\_number})'}}$$

k is a degree of correction and $\alpha$ defines the sharpness of transition between corrected and non-corrected zones. Parameters k and $\alpha$ have the same meanings as for the soft specularity removal algorithm without adaptive threshold.

The second embodiment operates with the corresponding second algorithm below:

---
Algorithm 2: Adaptive soft specularity correction algorithm.
---
1:    In:
      I - image to be corrected;
      M - number of pixels in image I;
      {$I_{ref}$} - sequence of reference images;
      p - number of reference images;
      k, $\alpha$ - sigmoid function parameters.
2:    Out:
      $I_c$ - image with corrected specular zones.
3:    for l = 1, . . . , p do
4:      for p_number = 1, . . . , M do
5:        $IR^l$(p_number) ← I(p_number)/$I_{ref}^l$(p_number)
6:      end for
7:      $S^l$ ← LinApprox($IR^l$)
8:      $K^l$ ← $IR^l - S^l$ +1
9:    end for
10:   for p_number = 1, . . . , t do
11:     WR (p_number) ← AggregRatio(K(p_number))
12:     $g(\text{p\_number}) \leftarrow \frac{k}{1 + e^{-\alpha W(\text{p\_number})}}$
13:     $I_c$ (p_number) ← I(p_number)/W(p_number)$^{g(p\_number)}$
14:   end for

---

Both Algorithm 1 and Algorithm 2, related to the first and the second embodiments for providing a corrected image of an object respectively, have the same correction principle. However, in Algorithm 1, the predefined threshold value V was previously included into the correcting function evaluation (line 8, Algorithm 1). For Algorithm 2, this value is no longer subtracted (line 12, Algorithm 2) as a result of the operation of linear approximation of the matrix of ratio values IR (line 7, Algorithm 2) and subtraction from the initial matrix of ratio values (line 8, Algorithm 2). This is similar to having a proper threshold value for each image pixel instead of fixed value V for all pixels of the image. Image correction is divided into two loops (line 3-9, Algorithm 2 and line 10-14, Algorithm 2) due to the necessity of identifying all values of the matrix of ratio values IR for the linear approximation S (line 7, Algorithm 2). All other operations, as for Algorithm 1, remain pixel-related.

The second embodiment provides results with enhanced quality where the image to be corrected relates to illumination conditions which differ significantly from the illumination conditions of reference images.

Thus, pixel values with a high intensity which may be generated by an effect of light due, for example, to the specific nature of the object, are considered for pixel correction and are less corrected than pixel having pixel values that generates a weighting value W higher than Vm_high.

Thus, pixel values with a low intensity which may be generated by an effect of light due, for example, to the specific nature of the object or the Petri dish, are considered for pixel correction and are less corrected than pixel having pixel values that generates a weighting value W higher than Vm_high.

The present invention provides a solution for replacing all pixel values of images being processed. The present invention provides simultaneous correction of pixel values of specific zones or image regions comprising bright pixels such as specular pixels and dark pixels such as shadow pixels. The invention provides a solution for correcting corresponding pixel values in such zones without requiring predetermined information regarding the illumination directions and/or location of illumination sources. The invention provides a method based on a multiplicity of images by sequentially considering all pixels in all images. This implies that the pixel information from all images is used to provide correction to any pixel being associated with a specular pixel or shadow pixel. The invention allows pixel values of specific zones comprising specific information associated with the image regarding a specific illumination direction to remain unchanged. Indeed, each pixel value of such specific zones is processed and replaced with the same pixel value as a different pixel value is not required for this pixel value. Pixel values of the specific zones may relate to shading information of the related image. Thus, in the present invention, all pixels in the images are taken into consideration and merged to provide replacement and also correction of pixel values. This aspect allows the orientation of the surface of the object to be reliably estimated when processing the photometric stereo method, for example, in a further step of the method. The processing of the further photometric stereo method is also improved as the present invention provides a multiplicity of corrected images based on the multiplicity of initial images. In a specific embodiment, a minimum of two images of the object are necessary to correct pixel values of only one image of the object if no further surface reconstruction process is required.

In addition, the present invention is suitable for restoring highlighted and shadowed zones of images even when considering zones of substantial size and comprising complex pixel texture.

In order to optimize the solution of the present invention, a significant number of images may be used and a significant number of illumination sources may be located evenly around the object. Thus, an increased amount of information related to pixel values of the object can be considered. As a result, the correction of pixel values may be improved. Furthermore, to optimize the correction of pixel values, a zone of interest must not totally overlap another zone of interest in all other images.

The method of the present invention applies in an optimal manner to images related to specular hemispheric objects such as images of micro-organisms. Thus, an additional photometric stereo reconstruction process provides images of surfaces of an object and depth maps of an object, both of improved quality when executed after the method for providing a corrected image according to the above-described first or second embodiment has been carried out.

The object of the photometric stereo reconstruction process is to provide a method, system and computer program product for generating a raised relief map or a representation of the surface of an object without using any information regarding the position and/or the direction of the illumination sources illuminating the object and without using any information regarding the normals of the surface of the object.

According to one aspect of the reconstruction process, there is provided a method for obtaining a model of an object surface from a plurality of images of said object, wherein the object is illuminated with one or more illumination sources, the method comprising:

obtaining a set of images each comprising an array of pixels and representing similar views of an object, wherein the similar views are obtained under different illumination conditions;

defining a model function that expresses the known pixel intensity values of the images in terms of the following unknown model components:

a first model component representing the albedo of the object at each pixel location, the first model component being an albedo value which is the same for the plurality of images;

a second model component representing an intensity of illumination for each image, the second model component being an illumination source intensity value which is the same for all pixels of each image;

a third model component representing a specific illumination direction, the third model component being an illumination vector which is different for each image and the same for all pixels of each image;

a fourth model component representing surface normal directions of the object surface at each pixel position, the fourth model component being a normal vector which is the same for all images;

performing one or more sequences of minimization operations to minimize a difference function between the pixel values obtained from the set of images and pixel values calculated using said model function, each minimization operation being performed by allowing one of said model components to vary while the others remain unchanged;

outputting the fourth model component as said model of the object surface.

Preferably, said sequence of minimization operations comprises an iterative loop in which each of said model components is varied in turn at least once before a subsequent iteration, said iterative loop being repeated until a termination condition is met.

Preferably, said iterative loop comprises one or more inner loops wherein a subset of said model components are varied a number of times before another subset of said model components is varied.

Preferably, one inner loop comprises varying said third model component and said fourth model component a number of times.

Preferably, one inner loop comprises varying said first model component and said second model component.

Preferably, minimization operations are performed, varying said third model component and said fourth model component a number of times before minimization is performed, varying said first model component and said second model component.

Preferably, the first model component comprises a first model sub-component and a first structuring component, wherein the first structuring component adapts the first model sub-component to reproduce the surface properties of the object.

Preferably, the second model component comprises a second model sub-component and a second structuring component, wherein the second structuring component adapts the second model sub-component to reproduce the illumination conditions of the illumination sources.

Preferably, the third model component comprises a third model sub-component and a third structuring component, wherein the third structuring component adapts the third model sub-component to reproduce the illumination conditions of the illumination sources.

Preferably, the first structuring component represents a same coefficient for the plurality of images comprising the same albedo value for each pixel for the plurality of images.

Preferably, the second structuring component represents a same intensity coefficient for all pixels of an image from the plurality of images.

Preferably, the third structuring component represents the direction of illumination of one illumination source associated with one image of said plurality of images, this being the same for all pixels of an image from the plurality of images.

Preferably, the one or more illumination sources comprise Red, Green and Blue color channels.

Preferably, the first model component is the same for each pixel and each color channel for the plurality of images and the second model component is the same for each color channel for all pixels of each image.

Preferably, the first structuring component comprises the same albedo value for each pixel for each color channel for the plurality of images.

Preferably, the second structuring component represents a same intensity coefficient for each color channel for all pixels of each image.

Preferably, model function comprises a modified model function, wherein the model function related to the first, second, third and fourth model components is equal to the modified model function related to the first, second and third model sub-components and the fourth model component.

According to a second aspect of the reconstruction process, there is provided a computer program product comprising instructions which when executed cause a programmable data processing apparatus to perform steps of the corresponding method.

According to a third aspect of the reconstruction process, there is provided an imaging system for obtaining a model of an object surface from a plurality of images of said object, the imaging system comprising:
 one or more illumination sources to illuminate the object with different directions of illumination, wherein each image is associated with a determined direction of illumination;
 an image capture device for detecting the pixel values of each pixel in each image of the plurality of images;
 a data processor comprising a first memory component for storing the following unknown model components:
  a first model component representing the albedo of the object at each pixel location, the first model component being an albedo value which is the same for the plurality of images;
  a second model component representing an intensity of illumination for each image, the second model component being an illumination source intensity value which is the same for all pixels of each image;
  a third model component representing a specific illumination direction, the third model component being an illumination vector which is different for each image and the same for all pixels of each image;
  a fourth model component representing surface normal directions of the object surface at each pixel position, the fourth model component being a normal vector which is the same normal vector for all images;
 wherein the data processor performs one or more sequences of minimization operations to minimize a difference function between the received pixel values over the set of images and pixel values calculated using a defined model function that expresses the known pixel values of images in terms of the unknown model components; and
 wherein each minimization operation is performed by allowing one of said model components to vary while the other model components remain fixed and
 for outputting the normal model component as said model of the object surface.

Preferably, the data processor further comprises a second memory component for storing structuring components to adapt one or more of the model sub-components to reproduce the surface properties of the object and the illumination conditions of the illumination sources.

The imaging system 100 further comprises a first memory component for storing a database of model components for storing four model components.

A first model component represents the albedo value of a pixel of an initial image associated with a first matrix A. The first matrix A comprises albedo values of pixels, each albedo value relating to the ratio of incident illumination being reflected by each pixel of the surface of the object. Thus, the albedo value represents an optical property which depends on the material of the surface of the object. The first matrix A has a number of rows which is equal to 3×ni, where each row represents albedo values for all pixels of an initial image for a specific color channel. Thus, three rows represent the three color channels R, G, B. The first matrix A comprises a number of columns which is equal to the number of pixels in an initial image.

A second model component represents the intensity of each illumination source and is associated with a second matrix L. Only one illumination source is used at a time for each image acquisition. Thus, the second matrix L is a matrix where each row with a non-null value relates to the intensity value of the illumination source which is unique for each initial image. The second matrix L contains a number of rows which is equal to 3×ni to represent the intensity value for each color channel of each initial image. The second matrix L comprises a number of columns which is equal to the value of the number np.

A third model component V represents the direction of illumination of each illumination source. The third model component comprises a third matrix V comprising three components Vx, Vy and Vz related to the orthonormal space (x, y, z). Thus, a vector (Vx, Vy, Vz) represents the direction of an illumination source during the image acquisition process. The third matrix V forces the condition of having only one specific or main illumination direction for all RGB channels for each initial image. For instance, a same illumination source such as a LED may be used for the three color channels R, G, B which all have the same illumination direction for a same image. The illumination source then emits a specific wavelength for each color channel. Thus, $V^T$ comprises three rows and a number of columns equal to 3×ni. In the present reconstruction process, due to calculation constraints based on the mathematical functions f and g indicated below, the transpose matrix $V^T$ should be used. The third model component V is then applied in the functions f and g below with the form of the transpose matrix $V^T$. Thus, the third matrix V has a number of rows equal to 3×ni, where a row represents a color channel and, as an initial image is represented with three color channels being R, G and B, an initial image is represented with three rows. The third matrix V comprises three columns where each column relates to an axis of the orthonormal space x, y, z.

A fourth model component represents the position of the three-dimensional normal or 3D normal of a pixel of an image. The 3D normal is a vector which is perpendicular to the tangent plane of the pixel. As the normal or surface orientation relates to a specific property of a surface, such property does not depend on illumination conditions. Thus, when considering a same pixel, the normal vector is the same in all images. The fourth model component is associated with a fourth matrix N. The fourth matrix N comprises a number of rows which is equal to 3 related to each axis of the orthonormal space x, y, z. The fourth matrix N comprises columns which represent the coordinates of each normal of a pixel in the orthonormal space (x, y, z). The fourth matrix N comprises a number of columns which is equal to the number np.

A first mathematical formula (1) as shown below models the photometric stereo model based on the above described four model components A, L, V and N:

$$f(A, L, V, N) = A \odot L \odot (V^T N) \qquad (1)$$

where $\odot$ represents a multiplication operation in an entry-wise manner wherein each value of a matrix is operated with the corresponding value of another matrix.

A, L, V and N must be retrieved with the method of the present reconstruction process to obtain f(A, L, V, N)=I.

Figure 62:
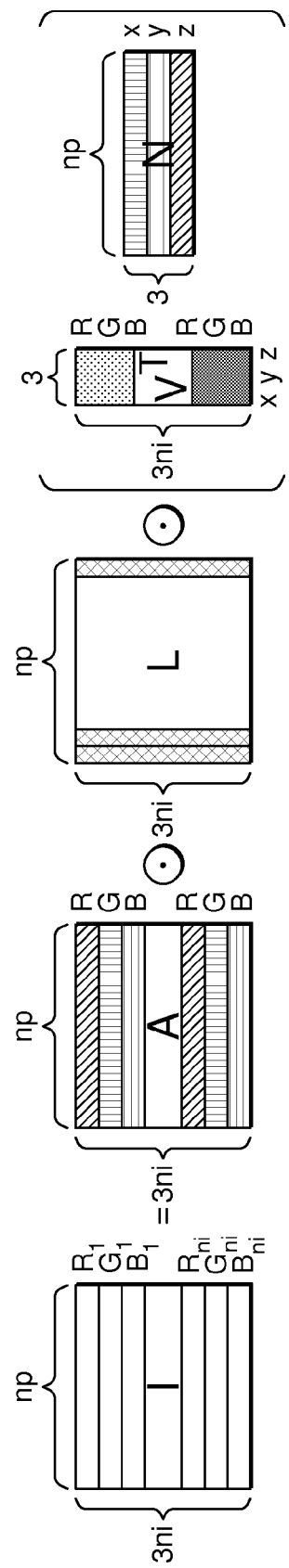
FIG. 62 shows a mathematical formula, which models the photometric stereo method, according to an embodiment of the present reconstruction process.

FIG. 62 schematically shows the structure of each matrix, A, L, V and N.

The mathematical formula (1) may comprise an optional matrix C which is used when considering images of large size with non-uniform illumination conditions. The mathematical formula (1) may then refer to an optional mathematical formula (1a):

$$f(A, L, C, V, N)=A \odot L \odot C \odot (V^T N) \quad (1a)$$

It will be understood that, according to an embodiment of the additional process, initial images relate to images of small size where the distribution of light may be considered to be uniform. Thus, the mathematical formula to be used does not comprise the optional matrix C and refers to the mathematical formula (1).

The above mathematical formula (1) may further comprise specific calculation optimizations to avoided increasing computation time due to the high amount of data being processed between all matrices A, N, L and $V^T$ for the four model components.

Thus, the data processor 114 further comprises a second memory component for storing a database of structuring components for storing at least three structuring components which optimize calculation. The structuring components W adapt the mathematical formula (1) by considering and modeling the physical properties and constraints of the initial images by considering illumination conditions and properties of the surface of the object.

A first structuring component $W_A$ represents a same albedo coefficient for the plurality of initial images and comprises only 0 and 1 values. As each pixel of the plurality of initial images has the same albedo value for a same color channel R, G or B, the matrix $W_A$ has a number of rows which is equal to 3×ni as shown below, for example:

$$W_A = \begin{bmatrix} 1 & 0 & 0 \\ 0 & 1 & 0 \\ 0 & 0 & 1 \\ 1 & 0 & 0 \\ 0 & 1 & 0 \\ 0 & 0 & 1 \\ 1 & 0 & 0 \\ 0 & 1 & 0 \\ 0 & 0 & 1 \end{bmatrix}_{where\ ni=3}$$

A second structuring component $W_L$ represents a same or identical intensity coefficient for all pixels of the plurality of initial images for each color channel.

Thus, as each illumination source is of equal intensity, $W_L$ is a vector having a length which equals the number np such as, for example:

$$W_L = [1\ 1\ 1(\ldots)1\ 1\ 1]$$

A third structuring component $W_V$ represents the direction of illumination of one illumination source associated with one image from the plurality of initial images for each pixel and for each color channel.

$W_V$ is as indicated below when considering three initial images.

$$W_V = \begin{bmatrix} 1 & 0 & 0 \\ 1 & 0 & 0 \\ 1 & 0 & 0 \\ 0 & 1 & 0 \\ 0 & 1 & 0 \\ 0 & 1 & 0 \\ 0 & 0 & 1 \\ 0 & 0 & 1 \\ 0 & 0 & 1 \end{bmatrix}$$

The optimization process is carried out to avoid repetitions of identical rows and columns for each matrix A, L and V and is performed by breaking down each matrix A, L and V into a multiplication of model sub-components, these being matrices A', L' and V' respectively and corresponding structuring components W, these being $W_A$, $W_V$ and $W_L$ respectively.

Thus, the model components are as follows (2):

for matrix A: $A = W_A . A'$
for matrix L: $L = L' . W_L$
for matrix V: $V = Wv . V'^T$ Matrices A', V' and L' represent a unique set of data related to pixels for one image. Matrices $W_A$, $W_V$ and $W_L$ respectively provide the coefficient for each matrix A', V' and L' to retrieve the content of matrices A, V and L when computing the multiplications shown in (2).

Thus, the data processor 114 also operates a corresponding function g which now comprises the structuring components and model sub-components as shown in the mathematical formula (3) below:

$$g(A', L', V', N)=(W_A \times A') \odot (L' \times W_L) \odot ((W_V \times V'^T) \odot N) \quad (3)$$

where f(A, L, V, N)=g(A', L', V', N)

The aim of the additional solution is to determine the values of the matrices A', L', V' and N to obtain the resulting value for g(A', L', V', N). The best resulting value is considered to be that which is as close as possible to the value of I, which represents the intensity value of initial images as taken from the image capture device 108. Thus, the function f or g has a known result which is equal to the value of I. Function g(A', L', V', N) comprises known structuring components which are $W_A$, $W_L$ and $W_V$. Model components A', L', V' and N must be evaluated to obtain a resulting value for g which is as close as possible to the observed value I.

Figure 63:
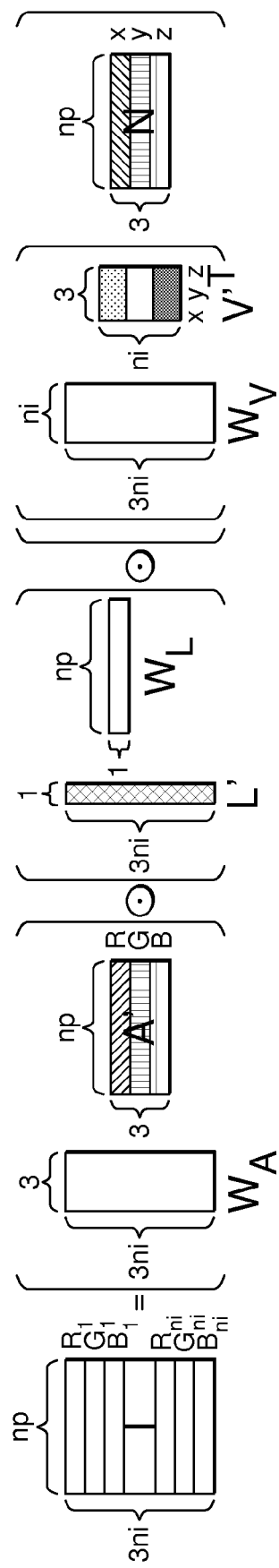
FIG. 63 shows a mathematical formula, which models the photometric stereo method, according to another embodiment of the present reconstruction process.

FIG. 63 schematically shows the structure of each model component A', L', V', N and of the structuring components $W_A$, $W_L$ and $W_V$.

Figure 64:
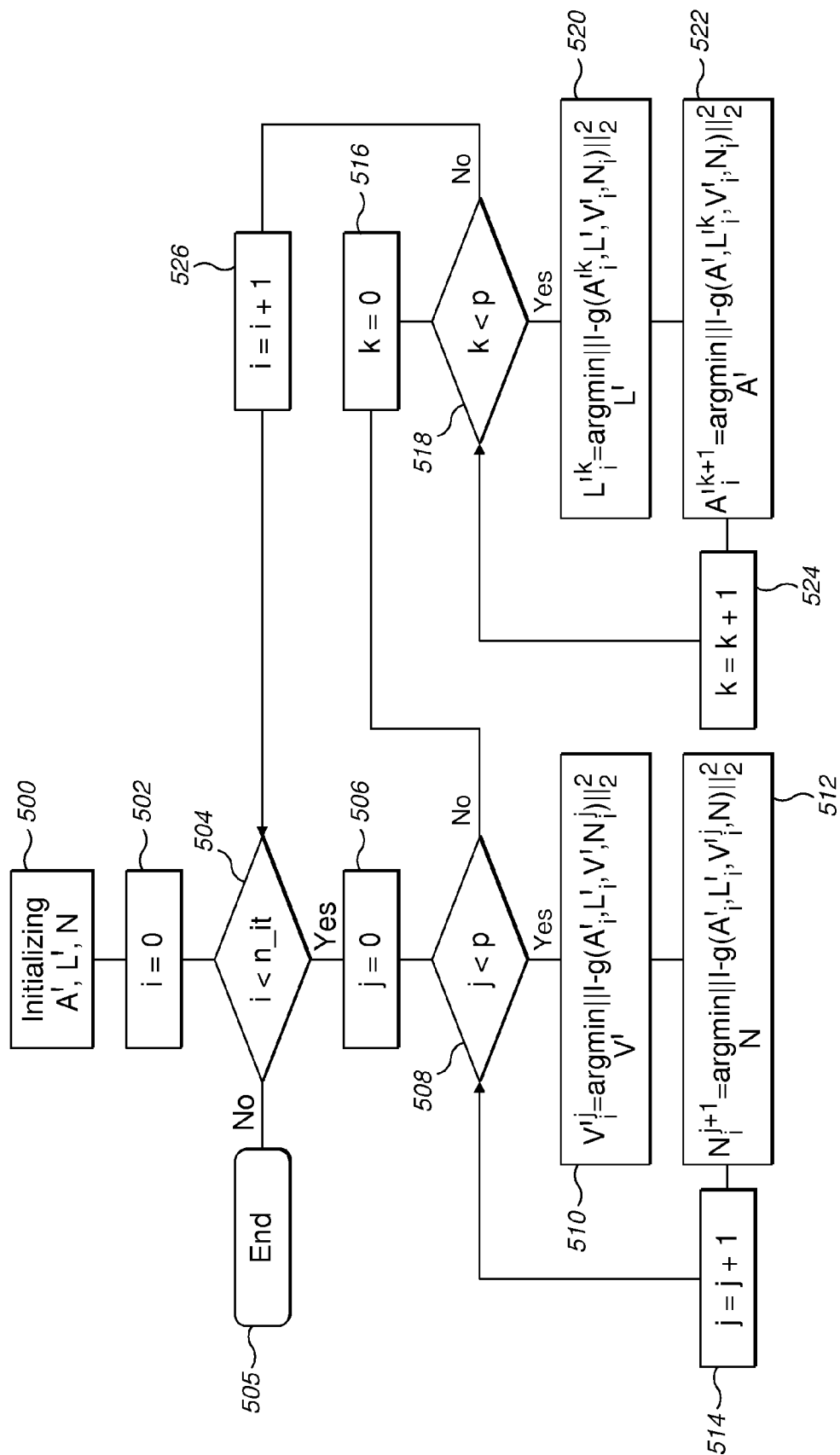
FIG. 64 shows a flowchart of the method, according to an embodiment of the present reconstruction process.
Figure 65:
FIG. 65 shows an example of an initial image of a first object, according to an embodiment of the present reconstruction process.
Figure 66:
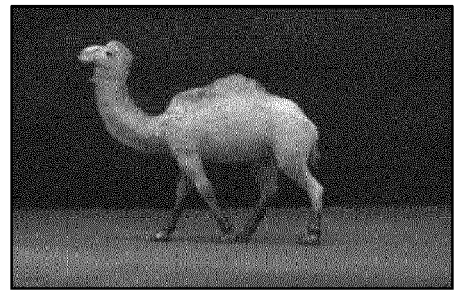
FIG. 66 shows an example of an initial image of a second object, according to an embodiment of the present reconstruction process.
Figure 67:
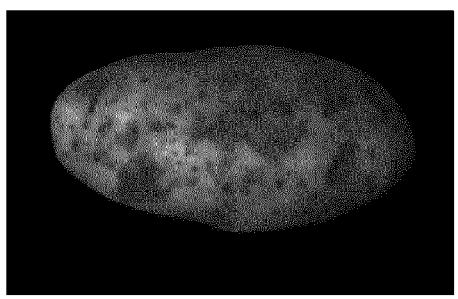
FIG. 67 shows an example of an initial image of a third object, according to an embodiment of the present reconstruction process.
Figure 68:
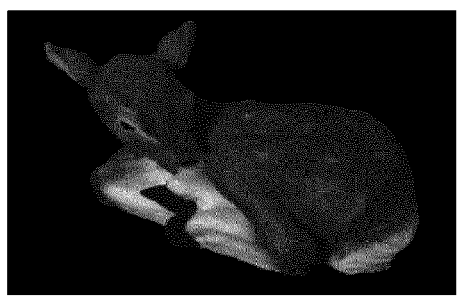
FIG. 68 shows an example of an initial image of a fourth object, according to an embodiment of the present reconstruction process.
Figure 69:
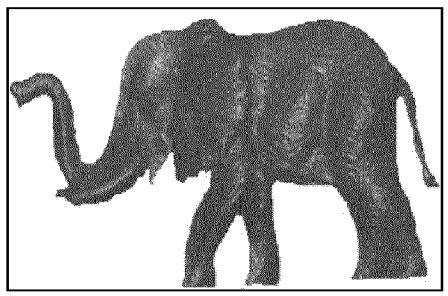
FIG. 69 shows a raised relief map of the first object of FIG. 65, according to an embodiment of the present reconstruction process.
Figure 70:
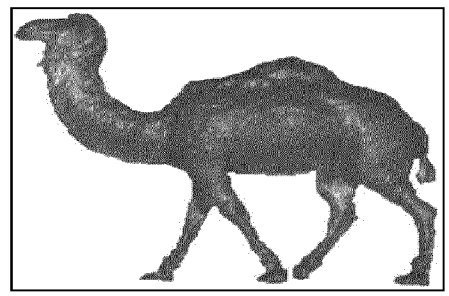
FIG. 70 shows a raised relief map of the second object of FIG. 66, according to an embodiment of the present reconstruction process.
Figure 71:
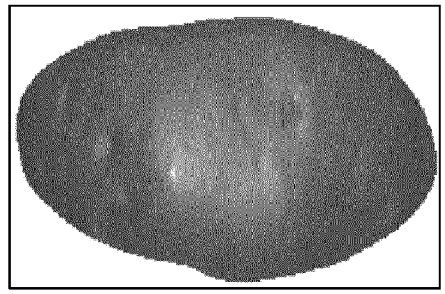
FIG. 71 shows a raised relief map the third object of FIG. 67, according to an embodiment of the present reconstruction process.
Figure 72:
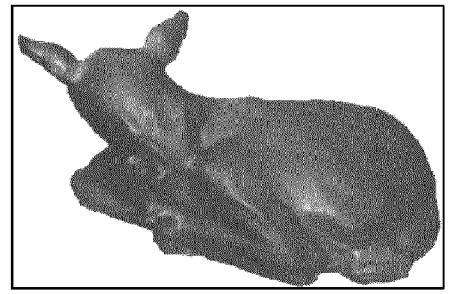
FIG. 72 shows a raised relief map the first object of FIG. 68, according to an embodiment of the present reconstruction process.

Function g(A', L', V', N) comprising model components A', L', V', N and corresponding structuring components $W_A$, $W_L$ and $W_V$ is used in the description of the method according to FIG. 64, as an embodiment of the present reconstruction process. The method according to FIG. 64 may also use the function f(A, L, V, N).

Thus, the additional process provides a method for determining the values of A', L', V' or A, L, V and N in a specific manner to minimize the error between the observed intensity I and the corresponding calculated intensity g or f. The raised relief map or the representation of the surface of the observed object may then be created by using the obtained matrix N related to the fourth model component.

The method comprises operating an algorithm based on the steps as shown in FIG. 64. The algorithm relates to an alternating optimization which belongs to one of the existing heuristic algorithms which consists in minimizing the objective function by successively setting all variables except one as disclosed in bibliographic references [1], [2] and [3]. Heuristic principles of alternating optimization are often used for providing blind source separation when one aims at observation matrix factorization into two matrices under certain conditions (e.g., non-negativity).

According to the additional process, the algorithm encompasses the four-component matrix representation and includes additional constraints for each model component.

The algorithm comprises two sub-minimization procedures as described below and shown in detail in FIG. 64.

The algorithm comprises a main loop associated with a main loop variable i and a termination condition. In the present embodiment, the termination condition for the main loop comprises a number of iterations n_it of the main loop. The number n_it may be equal to 10, for example. The main loop comprises inner loops being a first loop and a second loop. The first loop is associated with a first loop variable j and the second loop is associated with a second loop variable k.

In step 500, each model components A', L', N of the method is initialized to equal a corresponding determined value $A'_0$, $L'_0$, $N_0$.

In step 502, the value of i representing the main loop variable of the method is initialized to 0.

In step 504, the value of n_it is compared to the main loop variable i to determine if the value of n_it is greater than the value of the main loop variable i.

If the value of the number of iteration cycles n_it is greater than the value of the main loop variable i, then the process follows with step 506.

In step 506, the first loop variable j is initialized to 0.

In step 508, the value of the first loop variable j is compared to a predetermined value p associated with the first loop to determine if the value of p, such as p=5, is greater than the value of j. If the value of p is greater than the value of j, the method follows with step 510. Thus, j<p represents a termination condition.

Steps 510 and 512 below represent a first sub-minimization procedure. Thus, j<p is a termination condition for the first minimization method.

In step 510, an optimization process such as a minimization operation is applied. The minimization operation may comprise the application of a least square minimization technique such as a quadratic loss function. In the present embodiment, a quadratic loss function is applied to obtain the quadratic error between the observed intensity I and the calculated intensity by using the function g. In step 510, the quadratic loss function is based on a variation of the value of the model component V'. In step 510, a specific value of V' is evaluated to provide the minimum difference between the observed intensity I and the function g. The model components A', L', N remain unchanged. An evaluated value of V' is determined.

In step 512, the quadratic loss function is similarly based on the variation of the value of the model component N. In step 512, a specific value of N is determined to provide the minimum difference between the observed intensity I and the function g. The model sub-components A', L', V' remain unchanged. The value V' corresponds to the evaluated value of V' from step 510. An evaluated value of N is determined.

In step 514, the first loop variable j is increased from j to j+1.

In step 508, the increased value of j is compared with the value of p. The first loop operates until the value of j is greater than the value of p. When the value of j is lower than the value of p, step 510 operates again in a new iteration of the first loop. A new evaluated value of V' is determined by the minimization operation to obtain an optimal evaluated value V' that gives the minimum difference between I and g, wherein g considers the evaluated value of N from step 512 in a previous iteration of the first loop.

In a new iteration of the first loop in step 512, a new evaluated value of N is compared with all previous evaluated values of N of step 512 to determine the evaluated value N that gives the minimum difference between I and g, wherein g considers the evaluated value of V' from step 510 in a previous iteration of the first loop.

The first loop provides optimal evaluated values for V' and N.

When the value of j is greater than the value of p, the method follows with the second loop beginning at step 516.

In step 516, the second loop variable k is initialized to 0.

In step 518, the value of the second loop variable k is compared to the predetermined value p associated with the second loop to determine if the value of p, such as p=5, is greater than the value of k. If the value of p is greater than the value of k, the method follows with step 520.

Thus, k<p is a termination condition.

Steps 520 and 522 below represent a second sub-minimization procedure. Thus, k<p represents a termination condition for the second minimization method.

In step 520, the quadratic loss function applies with the model component L'. In step 520, a specific value of L' is evaluated to provide the minimum difference between the observed intensity I and the function g. The model sub-components A', V' and the model component N remain unchanged. The values of V' and N correspond to the optimal evaluated values of V' from the first loop which both give the minimum difference between I and g. An evaluated value of L' is determined.

In step 522, the quadratic loss function applies with the model component A'. In step 522, a specific value of A' is evaluated to provide the minimum difference between the observed intensity I and the function g. The model sub-components L', V' and the model component N remain unchanged. The value of L' corresponds to the evaluated value of L' from step 520 and the values of V' and N correspond to the optimal evaluated values of V' and N from the first loop which both give the minimum difference between I and g. An evaluated value of A' is determined.

In step 524, the second loop variable k is increased to k+1.

The second loop operates until the value of k is greater the value of p. When the value of k is lower than the value of p, step 520 operates again in a new iteration of the second loop. A new evaluated value of L' is determined by the minimization operation to obtain an optimal evaluated value L' that gives the minimum difference between I and g, wherein g considers the evaluated value of A' from step 520 in a previous iteration of the second loop.

When the value of k is greater than the value of p, the method follows with step 526 where the main loop variable i is increased to i+1.

The method then follows with step 504 to compare the number of loop iterations n_it with the value of the main loop variable i. The main loop operates until the number of iteration n_it is lower than the value of the main loop variable i. Where the value of the main loop variable i is greater than the value of the number of repetitions nit, then the method stops.

n_it represents a specific termination condition for the present method.

An alternative termination condition may comprise a threshold value associated with the difference value obtained between the observed intensity I and the calculated intensity f(A, L, V, N) or g(A', L', V', N). Thus, the method stops when the calculated difference between I and f or I and g is equal to or below the threshold value or a threshold difference value, for example.

Another alternative termination condition may be based on a threshold difference value. When using a threshold difference value, the method stops when the difference between two values of a same model component based on two consecutive iterations is equal to or below the threshold value.

The aim of the method is to consider separately and iteratively for each model component A', L', V' and N the value which gives the minimum difference in the calculation of the quadratic loss function. The method is based on main, first and second iterative loops to optimize the determination of the values of the model components A', L', V' and N. The aim of the repetition of the main loop, first loop and second loop is to reach the best convergence. Thus, for each of steps 510, 512, 520 and 522, the data processor 114 operates a comparison step at each iteration of the first and second loops and for each model component. Indeed, each time the data processor 114 calculates the quadratic loss function to obtain a difference value when increasing a specific model component, the data processor 114 compares the difference value obtained with any existing difference values previously obtained. Thus, the data processor 114 may determine the minimum difference value and retain the minimum difference value for further calculations.

The value of the number of iterations p is a determined number which may be the same for j and k. The first loop relates to model components V and N and the second loop relates to model components A and L for improved optimization of the method.

Model components V, N relate to interaction between the direction of the surface of the object and the direction of the illumination sources 104, 105, 106. Such interaction determines an angle between these two directions. Calculations related to the determination of such an angle are relatively complex to run due to the size of the corresponding matrices.

Thus, the first loop provides calculations regarding model components V and N or V' and N to optimize calculations and computation time associated with the second loop. The second loop provides calculations regarding model components A and L. A corresponds to a weighting coefficient associated with the surface of the object. L corresponds to a weighting coefficient associated with the illumination source. Thus, calculations related to such model components are relatively easy to run due to the size of the corresponding matrices.

The arrangement of the model components A, L, V, N or A', L', V' N in such a first and second loop provides for better convergence of the method. Thus, computation time is reduced when compared with a different arrangement of the model components A, L, V, N or A', L', V', N for carrying out the optimization process, such as the minimization operation.

Alternative arrangements may be: V', N, L', A' or V', N, A', L' or V', L' A', N or V', L', N, A' or V', A', N, L' or V', A', L', N.

When all iterations of main loop, first loop and second loop have been processed, the method stops.

The data processor 114 retrieves the value of N as determined from the method of the present reconstruction process. The data processor 114 then builds a surface pixel by pixel by considering the value of N for each pixel by applying one of the algorithms disclosed in bibliographical references [4], [5], [6] and [7].

Thus, the data processor 114 provides a raised relief map of the surface of the considered object.

FIGS. 65, 66, 67 and 68 each show an initial image of first objects. FIGS. 69, 70, 71 and 72 show raised relief maps of the surface of the objects of FIGS. 65, 66, 67 and 68 according to the present reconstruction process. In this embodiment, the number of loop iterations is n_it=10 and the value of the first and second loop variables is p=5.

Figure 73:
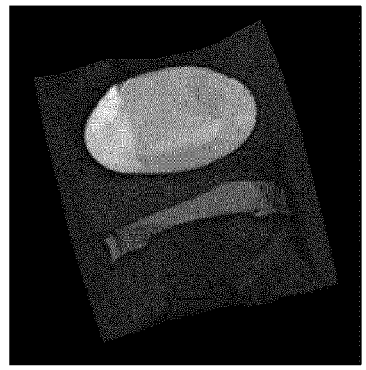
FIG. 73 shows an example of an initial image of a fifth object, according to an embodiment of the present reconstruction process.
Figure 74:
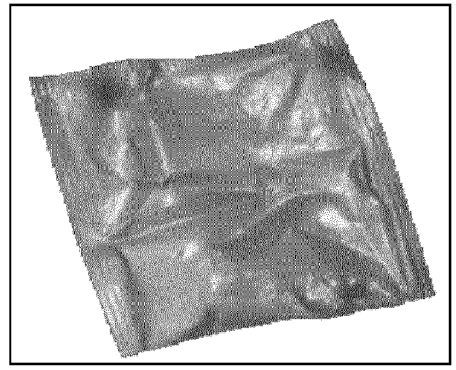
FIG. 74 shows a raised relief map of the fifth object of FIG. 73, when considering three initial images of the fifth object, according to an embodiment of the present reconstruction process.
Figure 75:
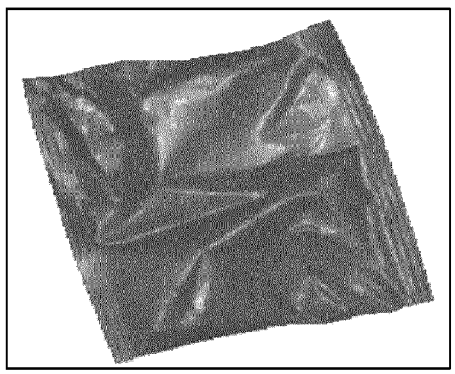
FIG. 75 shows a raised relief map of the fifth object of FIG. 73, when considering five initial images of the fifth object, according to an embodiment of the present reconstruction process.
Figure 76:
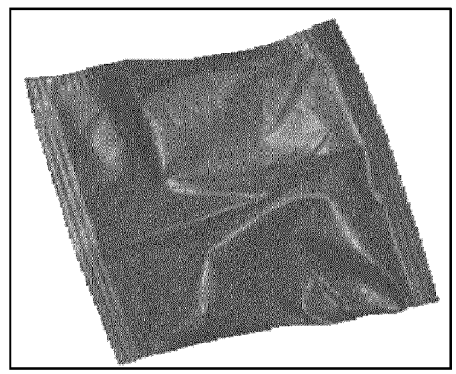
FIG. 76 shows a raised relief map of the fifth object of FIG. 73, when considering ten initial images of the fifth object, according to an embodiment of the present reconstruction process.
Figure 77:
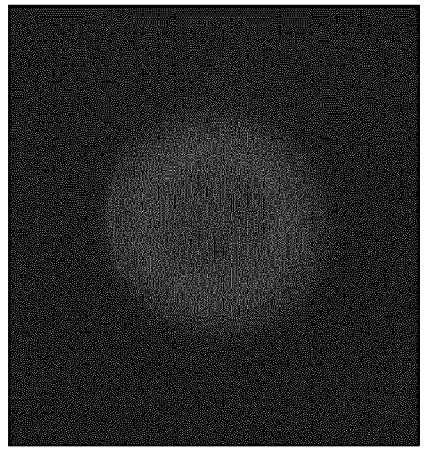
FIGS. 77, 78, 79 and 80 show four initial images of a sixth object, each initial image relating to a different direction of illumination, according to an embodiment of the present reconstruction process.
Figure 78:
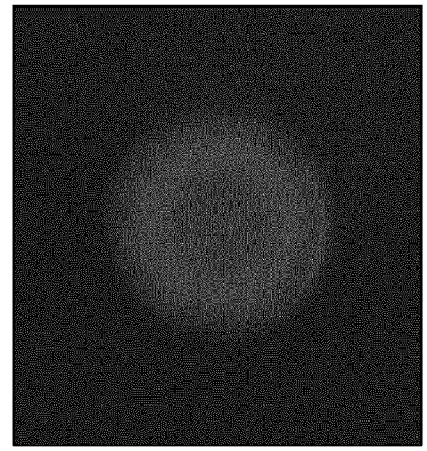
Figure 79:
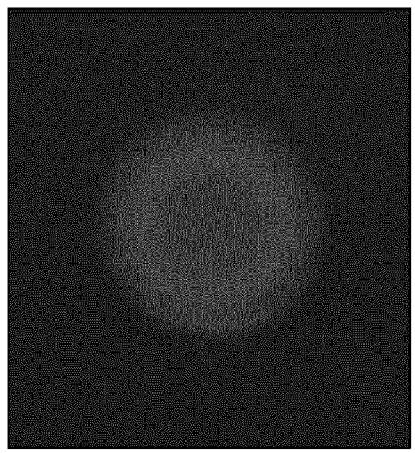
Figure 80:
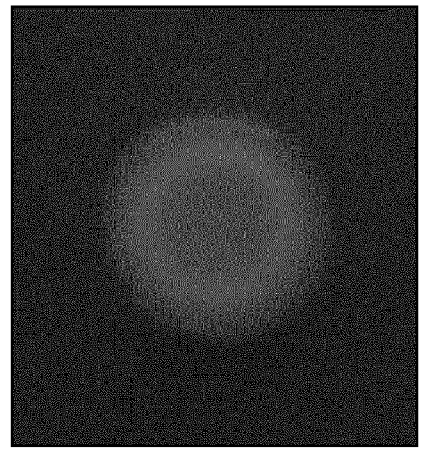

The present method ensures that a better evaluation of the model component A', L', V' and N is provided when considering a significant number of good quality images. In addition, an even spatial distribution of the illumination sources during image acquisition provides better results. FIG. 73 represents an initial image of an object being a tea bag. FIG. 74 shows a raised relief map of the object of FIG. 73 when considering three initial images of the object shown in FIG. 73. FIG. 75 shows a raised relief map of the object of FIG. 73 when considering five initial images of the object shown in FIG. 73. FIG. 76 shows a raised relief map of the object of FIG. 73 when considering ten initial images of the object shown in FIG. 73. From a visual check, the raised relief map in FIG. 76 comprises more details of the object than the raised relief maps in FIGS. 74 and 75. Visual results of analysis of the surfaces of the raised relief maps indicate an improved quality of the raised relief maps with no significant impact on the general surface aspect when compared to the initial image.

Figure 81:
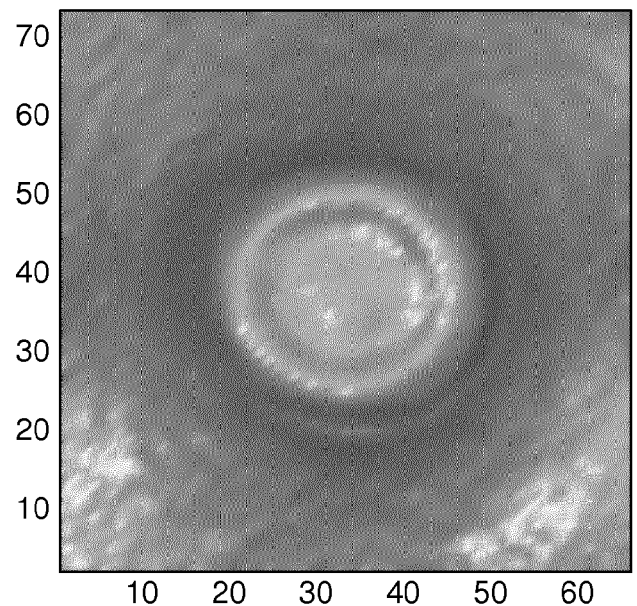
FIG. 81 shows a top view of a raised relief map of the sixth object when considering the initial images of FIGS. 77, 78, 79 and 80, according to an embodiment of the present reconstruction process.

FIGS. 77, 78, 79 and 80 show initial images of a first object being a micro-organism. FIG. 81 shows a top view of the raised relief map of the surface of the object of FIGS. 77, 78, 79 and 80.

Figure 82:
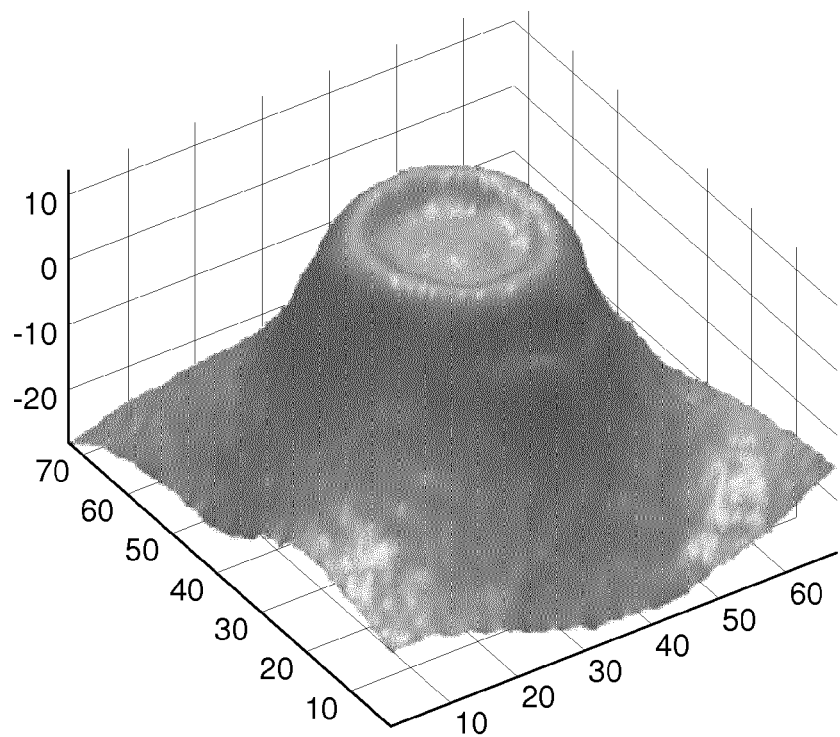
FIG. 82 shows a side view of the raised relief map of the sixth object as shown in FIG. 81, according to an embodiment of the present reconstruction process.
Figure 83:
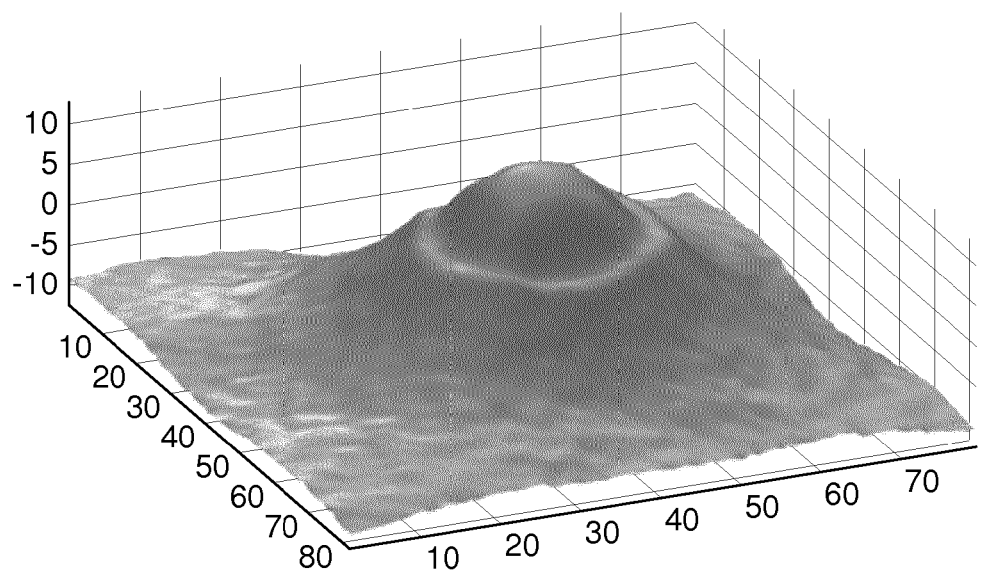
FIGS. 83, 84, 85 and 86 respectively show a side view of a raised relief map of various objects, according to an embodiment of the present reconstruction process.
Figure 84:
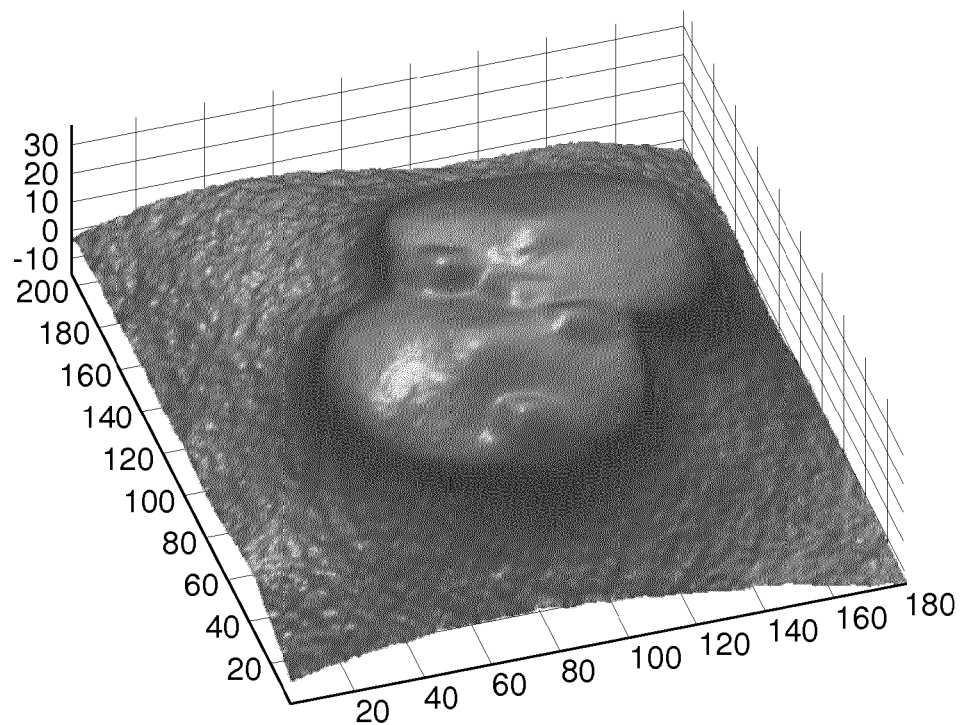
Figure 85:
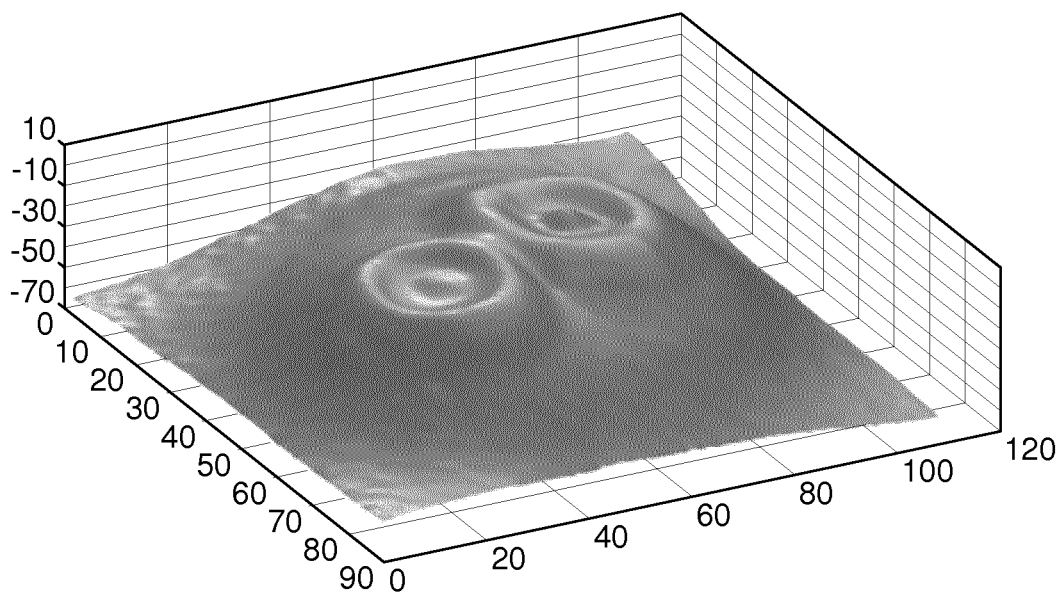
Figure 86:
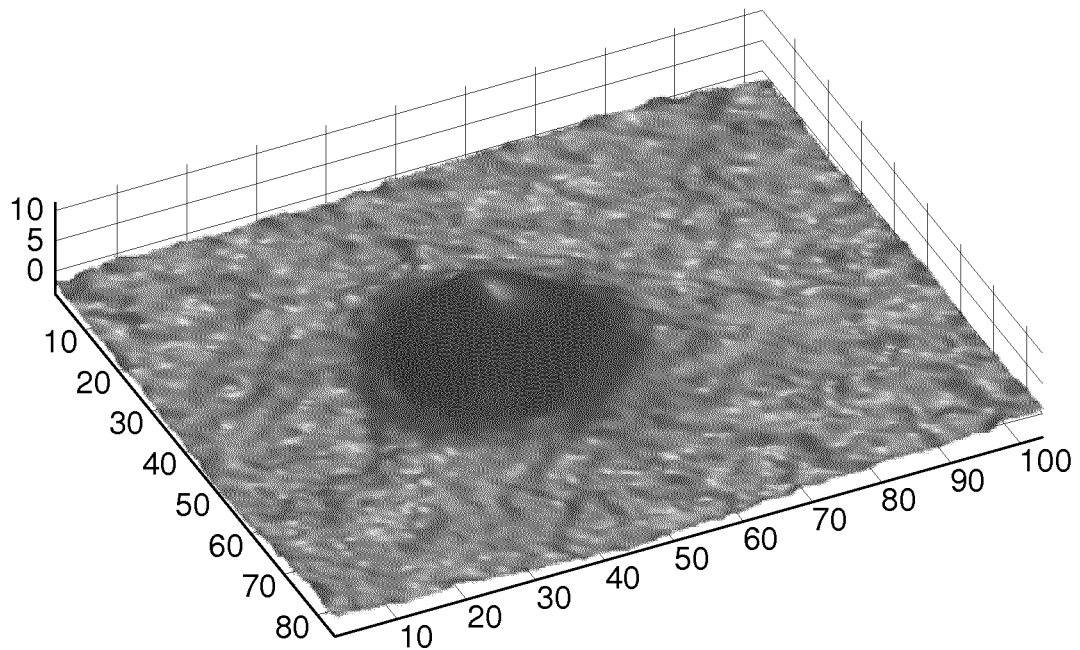

FIG. 82 represents a side view of the object of FIG. 81.

FIGS. 83, 84, 85 and 86 represent raised relief maps of various objects such as micro-organisms according to the additional process.

The above described optimization relates to a first embodiment of the present reconstruction process method which provides a solution for determining surface normals and for reconstructing the depth map.

In the above first embodiment, value constraints and quality constraints are not considered during the minimization steps. Each model component can be evaluated using least square method. During execution of the iterative procedure, values obtained after each sub-minimization can be projected into constraints. For albedo component A', all values of less than zero are equated to zero, and all values greater than one are set to one. A similar operation can be performed for light source intensities. Values in the L' matrix that are less than zero are set to zero or to a very low value. Lighting directions V' and surface normals N are only normalized after evaluation of the first minimization loop. Supplementary surface normals can be filtered by averaging filter with 3×3 sliding window in order to implement quality smoothness constraint just after normalization. Such post-evaluation constraints application is possible due to the iterative nature of the algorithm. Additional steps as described in the second embodiment below and relating to the evaluation of constraints may be provided at the end of the method to provide a first photometric stereo model component approximation.

In a second embodiment, the present reconstruction process provides a solution for considering value constraints and quality constraints for the photometric stereo model during execution of the optimization method.

In order to integrate value and quality restrictions for the photometric stereo components, the minimization functions for finding albedo values, light source intensities, light source directions and surface normals matrices take into account supplementary equality and inequality constraints. Minimization operations for each of the model components are described below.

In FIG. 64, the light source directions matrix including norm constraints should be found using the shown formula for V'

$$\text{subject to } v_{k,x}^2 + v_{k,y}^2 + v_{k,z}^2 = 1,$$

where k=1, . . . , ni, and vector $(v_{k,x}, v_{k,y}, v_{k,z})$ corresponds to the lighting direction used during the acquisition of the $k^{th}$ image.

In order to obtain the surface normals matrix with value norm constraint and quality constraints, the minimization procedure for matrix N in FIG. 64 should be used with the conditions below:

$$\begin{cases} n_{x,j}^2 + n_{y,j}^2 + n_{z,j}^2 = 1, \\ n_{x,j}^2 + n_{y,j}^2 = 0, \\ \sum_{p=-1}^{1} \sum_{l=-1}^{1} n_j^T n_j^{(p,l)} = 8, \\ \text{with } p \neq 0, l \neq 0 \end{cases}$$

where j=1, . . . , np, $n_j$ corresponds to 3D normal of the j'h pixel, and $n_j^{(p,l)}$ denotes the $j^{th}$ pixel neighbors in the initial non-vectorized image.

The light source intensity vector should contain only values greater than 0 and less than the maximum possible value of the image, H. Thus, the matrix L' shown in FIG. 64 should be used with the conditions below:

subject to $I_k > 0$, and $I_k < H$, where k=1, . . . , 3ni, ni is a number of input color images, and $I_k$ corresponds to the intensity of light source used during the acquisition of the $k^{th}$ input image.

Albedo matrix should contain only values from the interval [0; 1]. Thus, the minimization function A', for albedo approximation in FIG. 64 should be used with the conditions below:

subject to $\alpha_{k,j} \geq 0$, and $\alpha_{k,j} \leq 1$, where k=1, . . . , 3ni, j=1, . . . , np, ni is a number of input color images and np is a number of pixel in each input image.

Resolution of minimization problems with inequality constraints, i.e. albedo A' and light source intensities L' can be obtained by analyzing Karush-Kuhn-Tucker (KKT) conditions as shown in bibliographical reference [8], for the optimization error function including Lagrange multipliers, [9]. Due to the non-linear nature of the equality constraints for lighting directions and surface normals, the best solution for sub-minimizations can be obtained using the Levenberg-Marquardt algorithm for the loss function and including Lagrange multipliers as shown in bibliographical reference [10].

Photometric stereo model resolution provides unit normal, i.e. surface, orientation in each pixel. In order to obtain a depth map from these normal, one of the existing algorithms must be applied. Depth maps allow easier visual analysis of the resulting surface than that provided by a normal matrix. During experimentations, algorithms presented in bibliographical references [4], [5], [6] and [7] were tested. The integration algorithm presented in [4] turned out to be the fastest and the most efficient for all given examples. This algorithm is based on surface partial derivatives representation from two points of view: as discrete derivatives (simple difference between neighbor points) and derivatives calculated on the basis of surface normals. This algorithm was thus used for transition between normals obtained after the alternating optimization and the visualized depth map. In all the following demonstrations, the quality of reconstruction using the depth map is analyzed.

Figure 87:
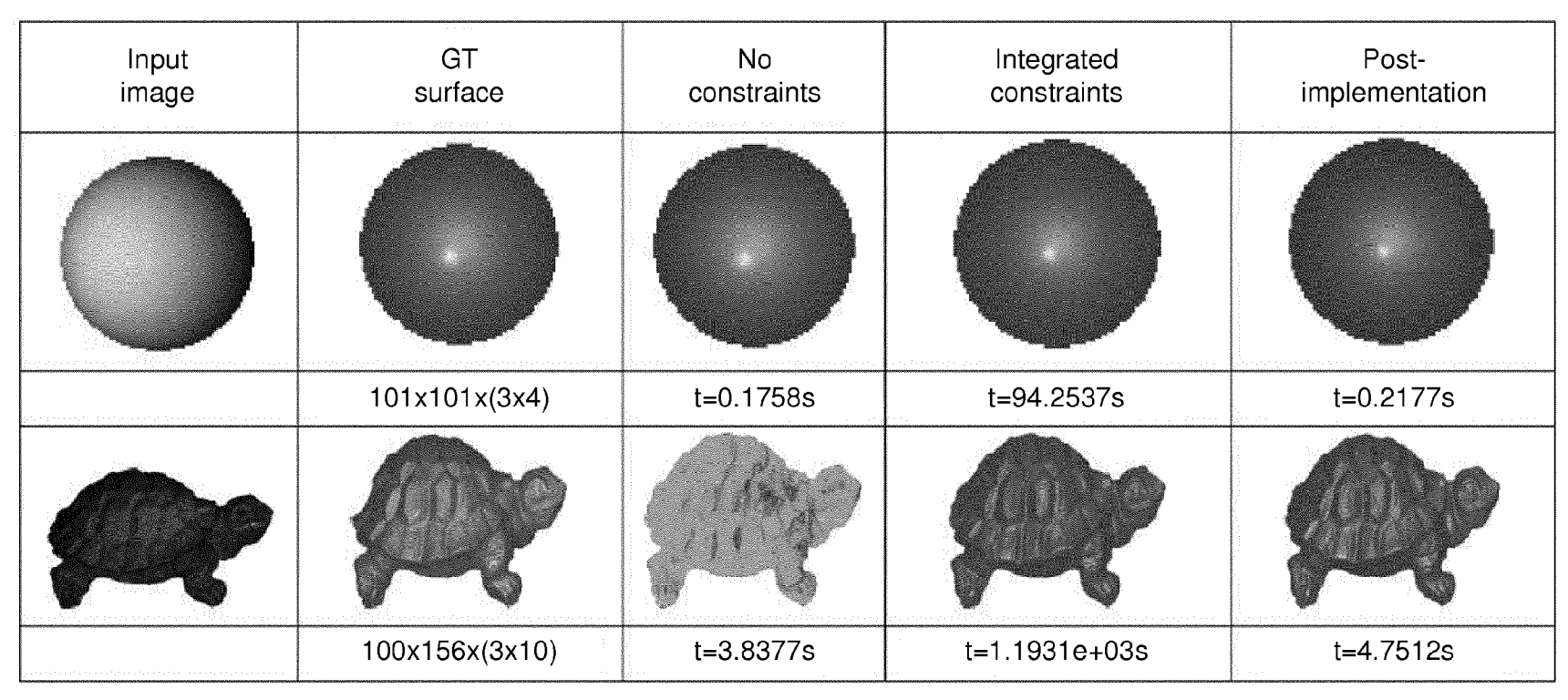

FIG. 87 shows a comparison of the reconstruction results for the simple hemispherical object and for the object from the MIT Intrinsic Images dataset as shown in bibliographical reference [11]. For the presented example, the alternating method from FIG. 64 was used with 10 global iterations and 5 internal iterations for each minimization. The results obtained show the necessity of implementing constraints. For a simple object such as a hemisphere, the alternating optimization with no variable value constraints is sufficient. However, more complicated surfaces require use of constraints. As shown in FIG. 87, different forms of constraints implementation can be compared with different processing times t: constraints directly integrated into each minimization procedure and projection to the space of constraints after each variable evaluation without constraints. The second implementation gives results close to the first one, but the processing time of evaluation is considerably reduced. Thus, in further experimentations, preference was given to the second mode of evaluation. Time of evaluation is presented for the system 64 bits, Intel® Core™ i7-2600, CPU 3.40 GHz, RAM=8Go using environment of Matlab R2012b.

In FIG. 64, step 500 relates to an initialization step based on determined values for A', L' and N.

When no prior information is available, initialization of model components necessary for alternating optimization algorithm should be made on the basis of the input images. Experimentations showed that influence of the initialization of some variables is more important than others. Most important is the initialization of the normals matrix N. All other variables which need initial values such as A' and L' may be chosen as matrices of one or random values. FIG. 88a relates to an initial image of an object. FIG. 88b relates to the image based on the matrix of the ground truth normals. FIG. 88c relates to the image based on the depth map. FIG. 88d shows a table comprising a plurality of resulting images arranged in a table for comparing the different images based on different initialization criteria for the matrix N. Each initialization criterion relates to a specific row in the table, as described below.

The first row No relates to initial values of N used at the first step of alternating procedure. Nx corresponds to the color channel R of the representation, Ny corresponds to the color channel G and Nz corresponds to the color channel B.

The second row relates to resulting values of normal encoded in R, G, B channels and obtained with different initializations from row No.

The third row "SF" relates to the resulting surface of the object, which corresponds to the depth map obtained on the basis of the resulting normals from row N.

The first column "Ones" relates to a unit matrix.

The second column "Randn" relates to a matrix of normally distributed random values, such as a matrix of values following a Gaussian distribution.

The third column "Rand" relates to a matrix of uniformly distributed random values.

The fourth column "3D normals to Med" relates to the matrix comprising different types of initialization for normal. Initial normals equal to 3D normals to each pixel median intensity value. It appears that the algorithm combining the criteria of the fourth column provides the best quality of images.

FIG. 88d contains reconstruction results for different initializations of matrix N. Thus, the reconstructed surface with initialized normals equal to 3D normals to each pixel median intensity value is significantly better than with other initialized normals.

In evaluated examples, albedo matrix A' was chosen as a unit matrix of the appropriate size [3×np]. Light source intensities vector L' was taken as a vector of 3ni median values of all images channels. Initial matrix N' of surface normal was defined as 3D normal to each pixel median intensity value. Thus, matrix N' is of required [3×np] size. The described initialization is not the only possible choice but, in combination with the proposed alternating method, has proved to be efficient for obtaining qualitative surfaces.

In the preferred embodiment shown in FIG. 64, the termination condition of the main loop is based on a defined number of iterative loops. Alternative termination conditions may comprise a small quadratic error between the initial data and the evaluated variables, and a small variation of variables (or just one, the most important variable) from one iteration to another. FIG. 89 comprises a table showing three different rows relating to different objects and wherein the first column relates to the ground truth surface, the second column relates to the first termination condition, the third column relates to a second termination condition, and the fourth column relates to a third termination condition and corresponding processing times t. Results show that it is possible to obtain satisfactory surfaces using all of the mentioned criteria. Depending on the reconstructed surface complexity, initial image size and quality, similar reconstruction results were obtained with a value of $it_{max}$ which is equal to 10 algorithm iterations, analysis of the model Err=$\|I-g(A'_i, L'_i, V'_i, N_i)\|_2^2$ and the normal variation Var=$\|N_i-N_{i-1}\|_2^2$ from one iteration to another. Err and Var are then compared to threshold values empirically determined. According to the desired results and evaluation time constraints, one of these criteria can be used.

The simplest criterion which can be chosen is a number of iterations. The number of iterations in the main loop is equal to 10, and the number of iterations in each of the sub-minimizations is 5. For these values, an algorithm convergence was obtained, and the quality of the resulting surfaces is sufficient for further analysis.

BIBLIOGRAPHICAL REFERENCES

[1] J. C. BEZDEK, R. J. HATHAWAY, Some Notes on Alternating Optimization, *Proceedings of the* 2002 *AFSS International Conference on Fuzzy Systems,* 2002, pp. 288-300.

[2] I. CSISZ'AR, G. TUSN'ADY, Information Geometry and Alternating Minimization Procedures, *Statistics & Decisions,* Supplement Issue 1 (1984) 205-237.

[3] R. J. HATHAWAY, Y. HU, J. C. BEZDEK, Local Convergence of Tri-level Alternating Optimization, *Neural Parallel & Scientific Comp.* 9 (2001) 19-28.

[4] R. BASRI, D. W. JACOBS, I. KEMELMACHER, Photometric Stereo with General, Unknown Lighting, *International Journal of Computer Vision* 72 (3) (2007) 239-257.

[5] R. T. FRANKOT, R. CHELLAPPA, A Method for Enforcing Integrability in Shape from Shading Algorithms, *IEEE Transactions on Pattern Analysis and Machine Intelligence* 10 (4) (1988) 439-451.

[6] E. COLEMAN, R. JAIN, Obtaining 3-Dimensional Shape of Textured and Specular Surfaces Using Four-Source Photometry, *Computer Graphics and Image Processing* 18 (1982) 309-328.

[7] P. KOVESI, Shapelets Correlated with Surface Normals Produce Surfaces, *Proceedings of the International Conference on Computer Vision,* 2005, pp. 994-1001.

[8] S. BOYD, L. VANDENBERGHE, Convex Optimization, *Cambridge University Press,* New York, N.Y., USA, 2004.

[9] R. T. ROCKAFELLAR, Lagrange Multipliers and Optimality, *SIAM* Rev. 35 (2) (1993) 183-238.

[10] K. LEVENBERG, A Method for the Solution of Certain Problems in Least Squares, *Quart. Applied Math.* 2 (1944) 164-168.

[11] R GROSSE, M. K. JOHNSON, E. H. ADELSON, W. T. FREEMAN, Groundtruth Dataset and Baseline Evaluations for Intrinsic Image Algorithms, *International Conference on Computer Vision,* 2009, pp. 2335-2342.

[12] Woodham, R. J. (1980): "Photometric method for determining surface orientation from multiple images", Optical engineering 19, pp. 513-531.

[13] Hayakawa, H. (1994): "Photometric stereo under a light source with arbitrary motion", Society of America 11, pp. 3079-3088.

The invention claimed is:

1. A method for correcting a plurality of images of an object (107), each image of the plurality of images comprising one or more pixels and each pixel comprising a pixel value, the method comprising the steps of:
   a) illuminating the object using one or more illumination sources (104, 105,106) with different directions of illumination, and each image is with a determined direction of illumination;
   b) selecting a pixel in a first image for obtaining the pixel value of the selected pixel;
   c) selecting at least one corresponding pixel in at least one other image of the of images for obtaining the pixel value of the at least one selected corresponding pixel;
   d) calculating at least one ratio of the pixel value of the selected pixel in the first image to each pixel value of the at least one selected corresponding pixel;
   e) determining a requirement for pixel value correction of the selected pixel on the basis of the at least one calculated ratio;
   f) calculating a value (W) based on the at least one calculated ratio to determine a corrected pixel value of the selected pixel;
   g) replacing the pixel value in the first image with the corrected pixel value to provide a corrected first image; and
   h) repeating steps a), b), c), d), e), f) and g) for each of the images in the plurality of images,
   wherein calculating a value (W) based on the at least one calculated ratio farther comprises applying a determined mathematical formula winch comprises a sigmoid function.

2. The method as claimed in claim 1, wherein the mathematical formula further comprises a parameter determining the required level of pixel value correction.

3. The method as claimed in claim 1, wherein the mathematical formula further comprises a parameter determining the sharpness of transition of the sigmoid function.

4. The method as claimed in claim 1 wherein the mathematical formula further comprises a parameter for adapting the level of pixel value correction.

5. The method as claimed in claim 1, wherein the plurality of images comprises different types of zones including bright zones or dark zones.

6. The method as claimed in claim 5, wherein the selected pixel is associated with a bright zone of an image.

7. The method as claimed in claim 5, wherein the selected pixel is associated with a dark zone of an image.

8. The method as claimed in claim 5, wherein the step of determining a corrected pixel value depends on the type of zone associated with the selected pixel.

9. The method as claimed in claim 1, wherein each of the images comprises the three color channels Red, Green, Blue and wherein steps a), b), c), d) and e) are iteratively carried out for each pixel, for each image and for each color channel.

10. A computer program product comprising stored computer-executable instructions which, when executed by a computer system, implement the method of claim 1.

11. The method as claimed in claim 8, wherein the zone is a bright zone.

12. The method as claimed in claim 8, wherein zone is a dark zone.

13. The method as claimed in claim 1, wherein the corrected images are further used in a process for generating a representation of the surface of the object.

14. The method as in claim 1, wherein the corrected images are further used in a process for generating a representation of the surface of the object.

15. An imaging system (100) for correcting a plurality of images of an object (107) each image of the plurality of images comprising one or more pixels and each pixel comprising a pixel value, the imaging system (100) comprising:

one or more illumination sources to illuminate the object with different directions of illumination, wherein each image is associated with a determined direction of illumination;

an image capture device (108) for obtaining pixel values of each pixel in each image of the plurality of images;

a data processor (114) for calculating at least one ratio of the pixel value of a selected pixel in a first image of the plurality of images to pixel values of at least one corresponding pixel selected in the remaining images of the plurality of images and for calculating a mean value of the ratio of the selected pixel to determine the requirement for pixel value correction of the pixel value of the selected pixel and to determine a corrected pixel value of the pixel value of the selected corresponding pixel, wherein the data processor (114) replaces the pixel value of the selected pixel with the corrected pixel value to provide a corrected image, and wherein determining a corrected pixel value further comprises applying a determined. mathematical formula, wherein the determined mathematical formula comprises a sigmoid function.

* * * * *

UNITED STATES PATENT AND TRADEMARK OFFICE
CERTIFICATE OF CORRECTION

PATENT NO. : 9,710,914 B2  
APPLICATION NO. : 14/892848  
DATED : July 18, 2017  
INVENTOR(S) : Allano et al.

Page 1 of 1

It is certified that error appears in the above-identified patent and that said Letters Patent is hereby corrected as shown below:

In the Claims

In Claim 1, Column 36, Line 59, please change as follows:
"farther comprises" to --further comprises--; and In Claim 1, Column 36, Line 60, please change as follows:
"winch comprises" to --which comprises--.

Signed and Sealed this
Twenty-fourth Day of April, 2018

Andrei Iancu
*Director of the United States Patent and Trademark Office*